(12) United States Patent
Takahashi et al.

(10) Patent No.: US 6,966,621 B2
(45) Date of Patent: Nov. 22, 2005

(54) INK-JET PRINTING METHOD, INK-JET PRINTING APPARATUS, AND PROGRAM

(75) Inventors: Kiichiro Takahashi, Kanagawa (JP); Osamu Iwasaki, Tokyo (JP); Minoru Teshigawara, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 174 days.

(21) Appl. No.: 10/677,370

(22) Filed: Oct. 3, 2003

(65) Prior Publication Data

US 2004/0070638 A1 Apr. 15, 2004

(30) Foreign Application Priority Data

Oct. 3, 2002 (JP) .............................. 2002-291454

(51) Int. Cl.⁷ ............................................. B41J 29/38
(52) U.S. Cl. ......................................... 347/12; 347/14
(58) Field of Search ........................ 347/12, 40, 14, 347/25, 15

(56) References Cited

U.S. PATENT DOCUMENTS

| | | | |
|---|---|---|---|
| 4,077,040 A | 2/1978 | Hendriks | 346/75 |
| 4,313,124 A | 1/1982 | Hara | 346/140 R |
| 4,345,262 A | 8/1982 | Shirato et al. | 346/140 R |
| 4,459,600 A | 7/1984 | Sato et al. | 346/140 R |
| 4,463,359 A | 7/1984 | Ayata et al. | 346/1.1 |
| 4,558,333 A | 12/1985 | Sugitani et al. | 346/140 R |
| 4,608,577 A | 8/1986 | Hori | 346/140 R |
| 4,635,078 A * | 1/1987 | Sakurada et al. | 347/15 |
| 4,723,129 A | 2/1988 | Endo et al. | 346/1.1 |
| 4,740,796 A | 4/1988 | Endo et al. | 346/1.1 |
| 5,488,398 A | 1/1996 | Matsubara et al. | 347/43 |
| 5,614,931 A * | 3/1997 | Koike et al. | 347/43 |
| 5,751,310 A | 5/1998 | Yano et al. | 347/43 |
| 5,982,998 A | 11/1999 | Takahashi et al. | 395/117 |
| 5,984,454 A | 11/1999 | Takahashi et al. | 347/43 |
| 6,092,939 A | 7/2000 | Nishikori et al. | 400/61 |
| 6,154,233 A | 11/2000 | Breswick | 347/40 |
| 6,206,516 B1 | 3/2001 | Moriyama et al. | 347/101 |
| 6,257,143 B1 | 7/2001 | Iwasaki et al. | 101/481 |
| 6,283,569 B1 | 9/2001 | Otsuka et al. | 347/15 |
| 6,302,511 B1 * | 10/2001 | Neese et al. | 347/19 |
| 6,305,775 B1 | 10/2001 | Ohtsuka et al. | 347/15 |
| 6,315,389 B1 * | 11/2001 | Torgerson et al. | 347/40 |
| 6,612,675 B1 | 9/2003 | Takahashi | 347/16 |
| 2002/0018088 A1 | 2/2002 | Takahashi et al. | 347/15 |
| 2002/0024558 A1 | 2/2002 | Fujita et al. | 347/43 |

FOREIGN PATENT DOCUMENTS

| | | |
|---|---|---|
| EP | 0 982 143 | 3/2000 |
| EP | 1 080 919 | 3/2001 |
| JP | 54-56847 | 5/1979 |
| JP | 59-123670 | 7/1984 |
| JP | 59-138461 | 8/1984 |
| JP | 60-71260 | 4/1985 |
| WO | WO 01/87619 | 11/2001 |

* cited by examiner

Primary Examiner—Lamson Nguyen
(74) Attorney, Agent, or Firm—Fitzpatrick, Cella, Harper & Scinto

(57) ABSTRACT

A controller generates printing data to be printed by the printing nozzles of at least first and second adjacent printing nozzle arrays out of a plurality of printing nozzle arrays on the basis of tone information of image data to be printed. In particular, the controller generates printing data to be printed by each of the first and second printing nozzle arrays in the range in which the influence of an air flow generated along with ink discharge from the first and second printing nozzle arrays is admissible. Printing by the first and second printing nozzle arrays of the printhead is controlled on the basis of the generated printing data.

17 Claims, 17 Drawing Sheets

F I G. 6
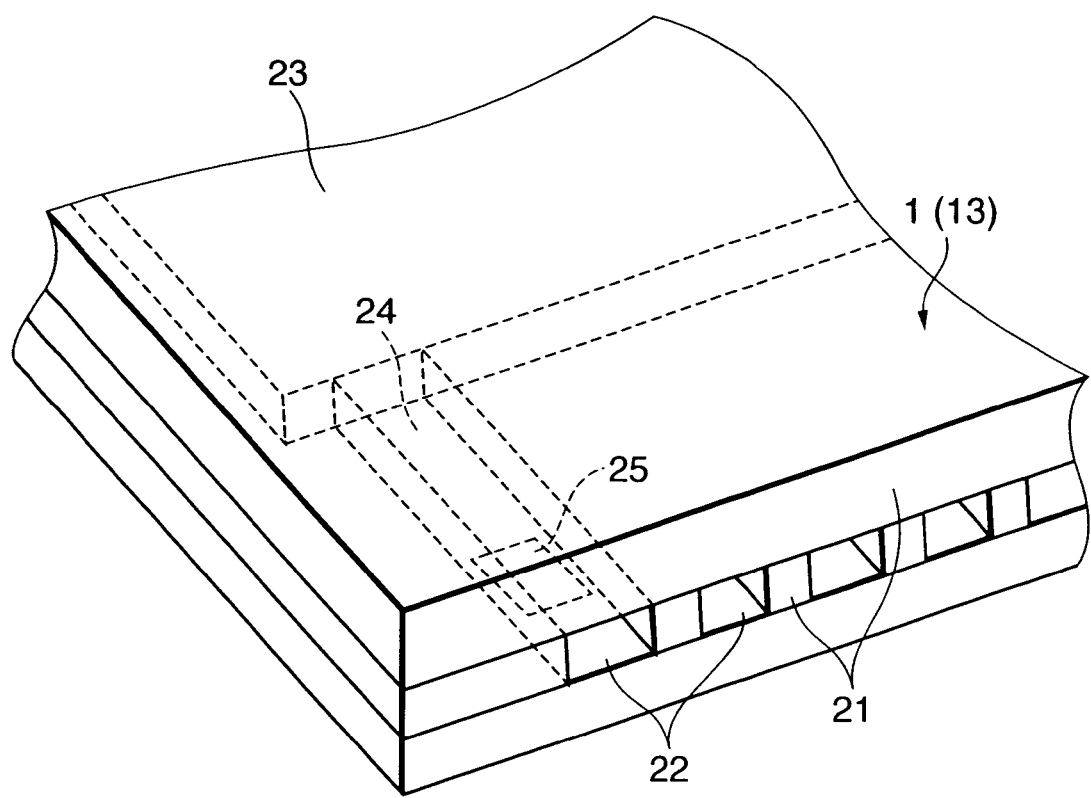

FIG. 11

| INPUT | PRINTING DOT | DISCHARGE INK AMOUNT |
|---|---|---|
| LEVEL 0 (000) | | 0 ng |
| LEVEL 1 (001) | | 2 ng |
| LEVEL 2 (010) | | 4 ng |
| LEVEL 3 (011) | | 7 ng |
| LEVEL 4 (100) | | 9 ng |
| LEVEL 5 (101) | | 12 ng |
| LEVEL 6 (110) | | 15 ng |
| LEVEL 7 (111) | | 20 ng |

INK-JET PRINTING METHOD, INK-JET PRINTING APPARATUS, AND PROGRAM

FIELD OF THE INVENTION

The present invention relates to an ink-jet printing method of printing on a printing medium by discharging ink from a printhead constituted by arraying a plurality of ink discharge printing nozzle arrays.

BACKGROUND OF THE INVENTION

At present, OA devices such as a personal computer and wordprocessor have widely spread, and various printing apparatuses and printing methods for printing information input by such OA device on a printing medium have been developed. Particularly, more OA devices process color information upon improvement of the information processing ability. Along with this, printing apparatuses for outputting information to be processed are shifting to color ones.

As a printing apparatus capable of forming a color image, there are proposed various printing apparatuses in terms of the cost, function, and the like, including a low-cost printing apparatus having a relatively simple function and a multi-functional printing apparatus capable of selecting the printing speed and image quality in accordance with the type of image to be printed and the application.

In particular, ink-jet printing apparatuses have a feature of easily achieving low noise, low running cost, downsizing, and color printing. Such ink-jet printing apparatuses are widely used for a printer, copying apparatus, facsimile apparatus, and the like.

Color ink-jet printing apparatuses generally print a color image by using three colors of ink, cyan, magenta, and yellow, or four inks including black ink in addition to these inks.

Conventional ink-jet printing apparatuses generally use dedicated paper having an ink absorption layer as a printing medium in order to obtain a color image at high color development without any ink blur. At present, printing apparatuses which have printing suitability for "plain paper sheets" used in large quantities by a printer, copying apparatus, and the like upon improvement of ink are also put into practical use.

A printing means for printing in a plurality of colors such as color printing is a printhead in which printing nozzle arrays are arranged side by side. In this printhead, printing nozzle arrays (nozzles for use) for respective colors that are used for printing are sequentially arranged along the main scanning direction perpendicular to the printing medium convey direction (sub-scanning direction). In single printing/scanning, ink droplets are discharged to the same raster from nozzles.

A means for performing higher-image-quality printing in the ink-jet printing apparatus using the side-by-side printhead is high-resolution printing. An effective means for this purpose is an arrangement using a high-density printhead in which the integration densities of printing elements and nozzles of the printhead are increased. Recently, high-density printheads using a semiconductor process have been introduced. Printheads whose printing nozzle arrays have a high density of 600 dpi (nozzle pit: about 42.3 μm) are also manufactured.

For higher densities, printheads in which a plurality of printing nozzle arrays are arranged parallel to each other and offset by a predetermined amount in the sub-scanning direction are also manufactured. For example, when the density of one printing nozzle array is 600 dpi, two printing nozzle arrays are arranged parallel to each other, and offset at 1,200 dpi (nozzle pitch: about 21.2 μm) in the sub-scanning direction. This printhead can be used as a 1,200-dpi high-density printhead.

Another means for printing at higher image quality is small-droplet printing. To realize this, an arrangement using a printhead in which the printing element and nozzle of a printhead are downsized to discharge small droplets becomes effective. In recent years, printheads capable of discharging small droplets at a discharge amount of 4 to 5 pl are available. Printheads advantageous to high-resolution printing are also manufactured.

Higher-image-quality printing can be achieved using a printhead advantageous to high-density printing, or a printhead capable of discharging small droplets advantageous to higher-resolution printing.

In the use of such printhead, however, the influence of ink discharge from a plurality of printing nozzle arrays may appear. Since ink droplets discharged from nozzles draw surrounding air, an air current (air flow) is generated by movement of ink droplets upon discharging many ink droplets and at the same time, high-speed movement of the printhead. The air flow may directly influence discharge.

A mechanism of generating an air flow will be described in detail. Generation of an air flow corresponding to operation of the printhead will be explained with reference to FIG. 1.

FIG. 1 is a plan view showing the discharge surface of the printhead. Ink is discharged from a printing nozzle (not shown) in a direction perpendicular to the sheet surface. In FIG. 1, as the printhead moves in the traveling direction (main scanning direction), it discharges ink from the printing nozzles of printing nozzle array 1 to print on a printing medium. At this time, an ink flow is generated by ink discharge immediately below the printing nozzles, and acts as a "gas wall" which inhibits a gas flow. If the printhead moves in the traveling direction in this state, an air current is generated behind the gas wall, and serves as an air flow (indicated by arrows in FIG. 1). Air then flows behind printing nozzle array 1 in the traveling direction. This air flow may influence ink discharge from printing nozzle array 2.

FIG. 2 is a side view showing the printhead.

Similar to FIG. 1, as the printhead moves in the traveling direction, it discharges ink from the printing nozzles of printing nozzle array 1 to print. An air current by an ink flow behind a gas wall will be explained. As shown in FIG. 2, a downward air current (air flow) is generated by discharging ink, and the flow direction is changed backward near a printing medium.

FIG. 3 is a front view showing the printhead in the traveling direction.

FIG. 3 particularly depicts printing nozzle array 2 of the printhead shown in FIG. 1 or 2. Similar to FIG. 1, as the printhead moves in the traveling direction, it discharges ink from printing nozzles to print. Ink droplets from printing nozzles at the ends of printing nozzle array 2 are discharged inward near a printing medium under the influence of an air flow.

As a result, ink droplets discharged from printing nozzles near the two ends of printing nozzle array 2 land at positions shifted inward from original landing positions on a printing medium, and are recognized as an image error identical to a distortion or discharge failure. This image error occurs because discharge of ink droplets from printing nozzles at ends shifts under the influence of an air flow flowing behind a gas wall described with reference to FIG. 1 and an air flow generated by ink discharge described with reference to FIG. 2.

The influence of such air flow is strong when the distances between a plurality of printing nozzle arrays of the printhead are short and the printing nozzle arrays are close to each other. The influence is weak for a large ink volume, but strong for a small ink volume. Also, the influence is strong for a high printing nozzle density because the number of ink droplets which generate an air flow increases. The influence is strong for a high moving speed of the printhead. Although the degree of influence changes depending on the type of printhead, its moving speed, and ink discharge conditions, an air flow is generated around the printhead.

In a printing apparatus using a conventional printhead, an air flow occurs depending on the ink discharge state and printing conditions of the printhead, degrading the quality of an image formed on a printing medium. To solve this problem, complicated printing conditions must be performed, or control disadvantageous to printing operation must be performed by excessively decreasing the moving speed of the printhead.

SUMMARY OF THE INVENTION

The present invention has been made to overcome the conventional drawbacks, and has as its object to provide an ink-jet printing method capable of suppressing an air flow generated around the printing nozzle array of a printhead.

According to the present invention, the foregoing object is attained by providing an ink-jet printing method of printing on a printing medium by discharging ink from a printhead constituted by arraying a plurality of printing nozzle arrays each formed by a plurality of printing nozzles for discharging ink, comprising:

a generation step of generating printing data to be printed by each of at least first and second adjacent printing nozzle arrays out of the plurality of printing nozzle arrays on the basis of tone information of image data to be printed;

and a printing step of printing by discharging ink to a pixel of the printing medium from the first and second printing nozzle arrays on the basis of the printing data generated in the generation step, wherein in the generation step, printing data corresponding to each of the first and second printing nozzle arrays is generated in a range in which a sum of the number of dots to be printed by the first printing nozzle array and the number of dots to be printed by the second printing nozzle array does not exceed a predetermined number.

In a preferred embodiment, the predetermined number includes a maximum number of printing dots with which influence of an air flow generated along with ink discharge from the first and second printing nozzle arrays is admissible.

In a preferred embodiment, the first and second printing nozzle arrays are arranged via a common ink chamber.

In a preferred embodiment, in the generation step, printing data corresponding to each of the first and second printing nozzle arrays is so generated as to relatively decrease the number of printing dots by the second printing nozzle array as the number of printing dots by the first printing nozzle array relatively increases.

According to the present invention, the foregoing object is attained by providing an ink-jet printing method of printing on a printing medium by discharging ink from a printhead constituted by arraying a plurality of printing nozzle arrays each formed by a plurality of printing nozzles for discharging ink, comprising:

a generation step of generating printing data to be printed by each of at least first and second adjacent printing nozzle arrays out of the plurality of printing nozzle arrays; and a printing step of printing by discharging ink to a predetermined region of the printing medium from the first and second printing nozzle arrays on the basis of the printing data generated in the generation step, wherein in the generation step, printing data to be printed in the predetermined region by each of the first and second printing nozzle arrays is so generated as to suppress a sum of a printing ratio of printing by the first printing nozzle array and a printing ratio of printing by the second printing nozzle array to be not more than a predetermined ratio.

According to the present invention, the foregoing object is attained by providing an ink-jet printing method of printing on a printing medium by discharging ink from a printhead constituted by arraying a plurality of printing nozzle arrays each formed by a plurality of printing nozzles for discharging ink, comprising:

a generation step of generating printing data to be printed by each of at least first and second adjacent printing nozzle arrays out of the plurality of printing nozzle arrays; and a printing step of printing by discharging ink to a predetermined region of the printing medium from the first and second printing nozzle arrays on the basis of the printing data generated in the generation step, wherein in the generation step, printing data to be printed in the predetermined region by each of the first and second printing nozzle arrays is generated in a range in which influence of an air flow generated along with ink discharge from the first and second printing nozzle arrays is admissible.

In a preferred embodiment, the admissible range includes a range in which a shift amount from an ideal landing position of a dot is less than half of a dot diameter regardless of the influence of an air flow.

According to the present invention, the foregoing object is attained by providing an ink-jet printing apparatus which prints on a printing medium by discharging ink from a printhead constituted by arraying a plurality of ink discharge printing nozzle arrays, comprising:

generation means for generating printing data to be printed by each of at least first and second adjacent printing nozzle arrays out of the plurality of printing nozzle arrays on the basis of tone information of image data to be printed; and control means for controlling printing by the first and second printing nozzle arrays on the basis of the printing data generated by the generation means, wherein the generation means generates printing data corresponding to each of the first and second printing nozzle arrays in a range in which a sum of the number of dots to be printed by the first printing nozzle array and the number of dots to be printed by the second printing nozzle array does not exceed a predetermined number.

In a preferred embodiment, the predetermined number includes a maximum number of printing dots with which influence of an air flow generated along with ink discharge from the first and second printing nozzle arrays is admissible.

In a preferred embodiment, the first and second printing nozzle arrays are arranged via a common ink chamber.

In a preferred embodiment, a first ink amount discharged from the first printing nozzle array by one discharge is different from a second ink amount discharged from the second printing nozzle array by one discharge.

In a preferred embodiment, the first ink amount discharged from the first printing nozzle array by one discharge is larger than the second ink amount discharged from the second printing nozzle array by one discharge.

In a preferred embodiment, a first printing ratio by the first printing nozzle array is higher than a second printing ratio by the second printing nozzle array.

In a preferred embodiment, the generation means independently generates printing data corresponding to the first and second printing nozzle arrays.

In a preferred embodiment, index processing of converting one printing data generated on the basis of the image data to be printed into printing data for the plurality of printing nozzle arrays is performed.

In a preferred embodiment, the first and second printing ratios are set different from each other in each printing mode.

In a preferred embodiment, the first and second printing nozzle arrays discharge the same type of ink.

In a preferred embodiment, the first and second printing nozzle arrays discharge different types of inks.

According to the present invention, the foregoing object is attained by providing an ink-jet printing apparatus which prints on a printing medium by discharging ink from a printhead constituted by arraying a plurality of printing nozzle arrays each formed by a plurality of printing nozzles for discharging ink, comprising:

generation means for generating printing data to be printed by each of at least first and second adjacent printing nozzle arrays out of the plurality of printing nozzle arrays; and printing control means for printing by discharging ink to a predetermined region of the printing medium from the first and second printing nozzle arrays on the basis of the printing data generated by the generation means, wherein the generation means generates printing data to be printed in the predetermined region by each of the first and second printing nozzle arrays in a range in which influence of an air flow generated along with ink discharge from the first and second printing nozzle arrays is admissible.

In a preferred embodiment, the admissible range includes a range in which a shift amount from an ideal landing position of a dot is less than half of a dot diameter regardless of the influence of an air flow.

According to the present invention, the foregoing object is attained by providing a program which controls an ink-jet printing apparatus which prints on a printing medium by discharging ink from a printhead constituted by arraying a plurality of ink discharge printing nozzle arrays, comprising:

a program code for a generation step of generating printing data to be printed by each of at least first and second adjacent printing nozzle arrays out of the plurality of printing nozzle arrays on the basis of tone information of image data to be printed, wherein in the program code for the generation step, printing data to be printed in a pixel by each of the first and second printing nozzle arrays is generated in a range in which a sum of the number of dots to be printed by the first printing nozzle array and the number of dots to be printed by the second printing nozzle array does not exceed a predetermined number.

In a preferred embodiment, the program runs in a host apparatus which supplies printing data to the ink-jet printing apparatus.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 6 is a perspective view schematically showing the structure of the main part of the ink discharge portion of the printhead according to the first embodiment of the present invention;

FIG. 11 is a table showing an example of index control according to the first embodiment of the present invention;

DETAILED DESCRIPTION OF THE PREFERRED EMBODIMENTS

Preferred embodiments of the present invention will be described in detail below with reference to the accompanying drawings.

The present invention can be applied to all devices using printing media (e.g., paper, cloth, leather, nonwoven fabric, OHP sheet, and metal). Examples of applied devices are office devices (e.g., printer, copying apparatus, and facsimile), and industrial production devices.

A serial printer type ink-jet printing apparatus having a plurality of printheads will be exemplified as an embodiment of the present invention.

In an embodiment of the present invention, the printing ratios of respective printing nozzle arrays are acquired in a printhead having a plurality of printing nozzle arrays. The printing ratio of one printing nozzle array is set in accordance with that of another printing nozzle array.

This can suppress an image error caused by an air flow generated depending on the discharge state and printing conditions of the printhead. The performance of the printhead can be maximized to realize optimal printing. That is, the present invention can provide an ink-jet printing apparatus and ink-jet printing method capable of printing almost free from any air flow by managing the printing ratios of printing nozzle arrays without complicated control.

An example of printing control will be explained with reference to FIG. 4.

One factor which determines whether an air flow occurs or not is the distance between adjacent printing nozzle arrays. For example, an air flow hardly occurs when the distance is a pixel interval of 600 dpi for 20 pixels or more, but may occur for 10 pixels or less. Generation of an air flow changes depending on the printing conditions of the printhead such as the printhead performance, the ink discharge amount per operation, and ink discharge conditions.

The present invention realizes printing control capable of suppressing an air flow in consideration of the printing conditions of the printhead.

Figure 4:
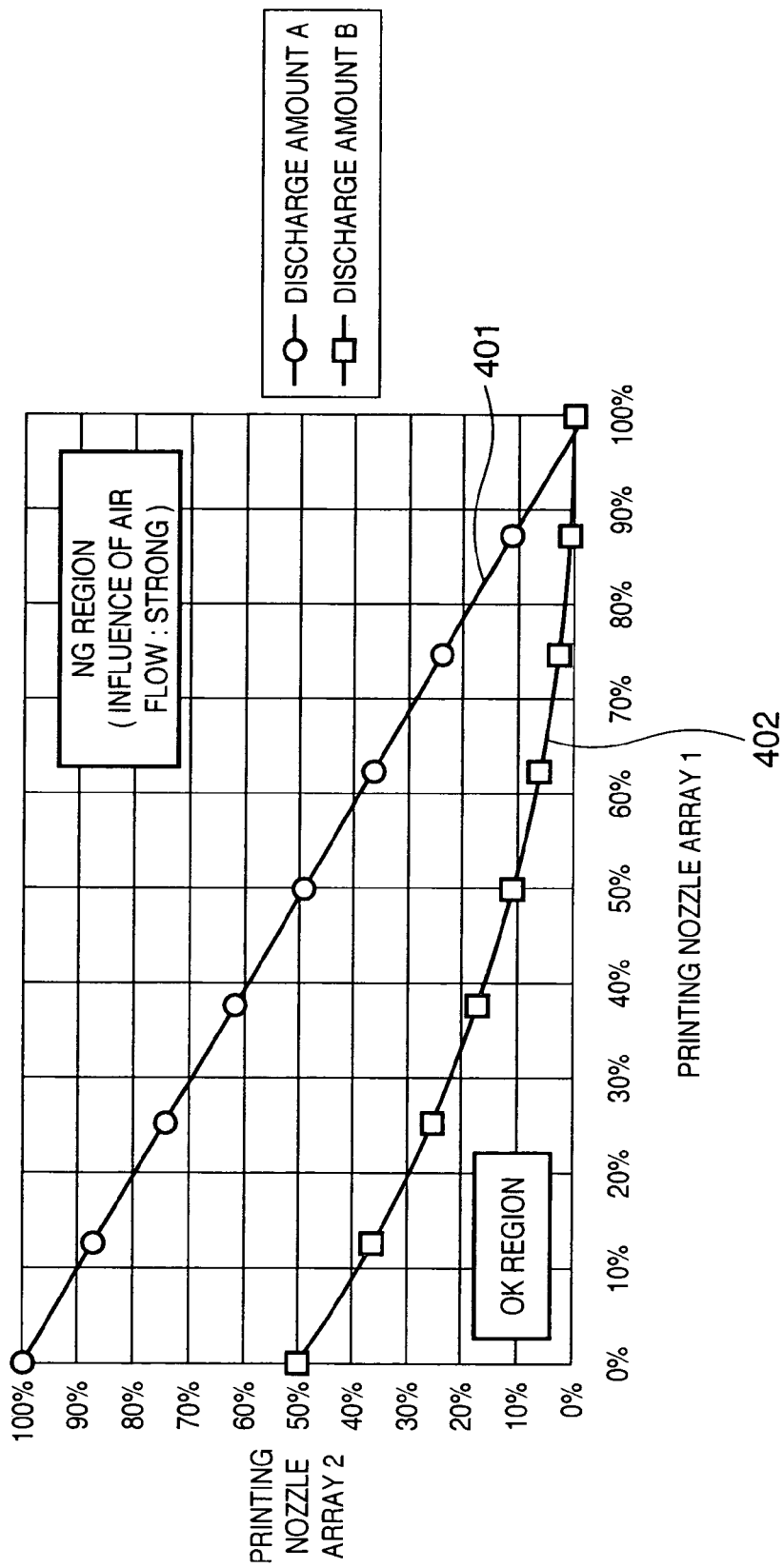
FIG. 4 is a graph showing the printing ratios of a plurality of printing nozzle arrays of a printhead applicable to each embodiment of the present invention.

FIG. 4 is a graph showing the printing ratios of a plurality of printing nozzle arrays of a printhead applicable to each embodiment of the present invention.

FIG. 4 shows a printing ratio management table in which the abscissa represents the printing ratio of printing nozzle array 1 and the ordinate represents the printing ratio of printing nozzle array 2 determined in accordance with that of printing nozzle array 1 in a printhead having printing nozzle array 1 and printing nozzle array 2 arranged parallel to it in the main scanning direction.

The printing ratio is defined as 100% when ink is discharged from all the printing nozzles of printing nozzle array 1 out of the printing nozzle arrays of the printhead, thereby printing in the entire printing region to be printed by one scanning of the printhead. Alternatively, the printing ratio is defined as 100% when data is printed in the entire printing region which can be printed by one scanning by one printing nozzle array of the printhead per unit time. However, the definition of the printing ratio is not limited to them, and may be properly determined in accordance with the application and purpose.

In FIG. 4, when printing is done in discharge amount A, a printing ratio control line 401 which makes the discharge amount per nozzle equal between printing nozzle array 1 and printing nozzle array 2 is set. In this case, as the printing ratio of printing nozzle array 1 increases, that of printing nozzle array 2 decreases. Their printing ratios have an almost linear relationship.

A region above the printing ratio control line 401, i.e., region where the sum of the printing ratios of printing nozzle array 1 and printing nozzle array 2 is large is set as an NG region where the influence of an air flow is strong and the quality of an image formed on a printing medium is low. A region below the printing ratio control line 401, i.e., the region where the sum of the printing ratios of printing nozzle array 1 and printing nozzle array 2 is small, is set as an OK region where the influence of an air flow is weak and the quality of an image formed on a printing medium is high. In printing control, printing is set to be executed using the OK region.

When printing is done in discharge amount B, a printing ratio control line 402 which makes the discharge amount per nozzle of printing nozzle array 2 about half that of printing nozzle array 1 is set. Also in this case, as the printing ratio of printing nozzle array 1 increases, that of printing nozzle array 2 decreases. Their printing ratios do not have any linear relationship, and the printing ratio of printing nozzle array 2 cannot be increased under strong influence of the printing ratio of printing nozzle array 1.

Also in this case, a region above the printing ratio control line 402, i.e., the region where the sum of the printing ratios os printing nozzle array 1 and printing nozzle array 2 is large, is set as an NG region where the influence of an air flow is strong and the quality of an image formed on a printing medium is low. A region below the printing ratio control line 402, i.e., the region where the sum of the printing ratios of printing nozzle array 1 and printing nozzle array 2 is small, is set as an OK region where the influence of an air flow is weak and the quality of an image formed on a printing medium is high. In printing control, printing is set to be executed using the OK region.

The first printing ratio of printing nozzle array 1 is preferably higher than the second printing ratio of printing nozzle array 2. Each printing ratio is determined on the basis of tone information of image data to be printed. The printing ratio may also be determined on the basis of the printing mode (e.g., high-image-quality printing mode or high-speed printing mode).

[First Embodiment]

The first embodiment is related to ink-jet printing that discharges ink onto a printing medium from the nozzles of a printhead having a plurality of printing nozzle arrays. Particularly in the first embodiment, the influence of an air flow by ink discharge is suppressed by controlling the numbers of dots to be discharged from a plurality of neighboring printing nozzle arrays.

In the following drawings, the same reference numerals denote the same or corresponding parts.

(Arrangement of Printing Apparatus)

Figure 5:
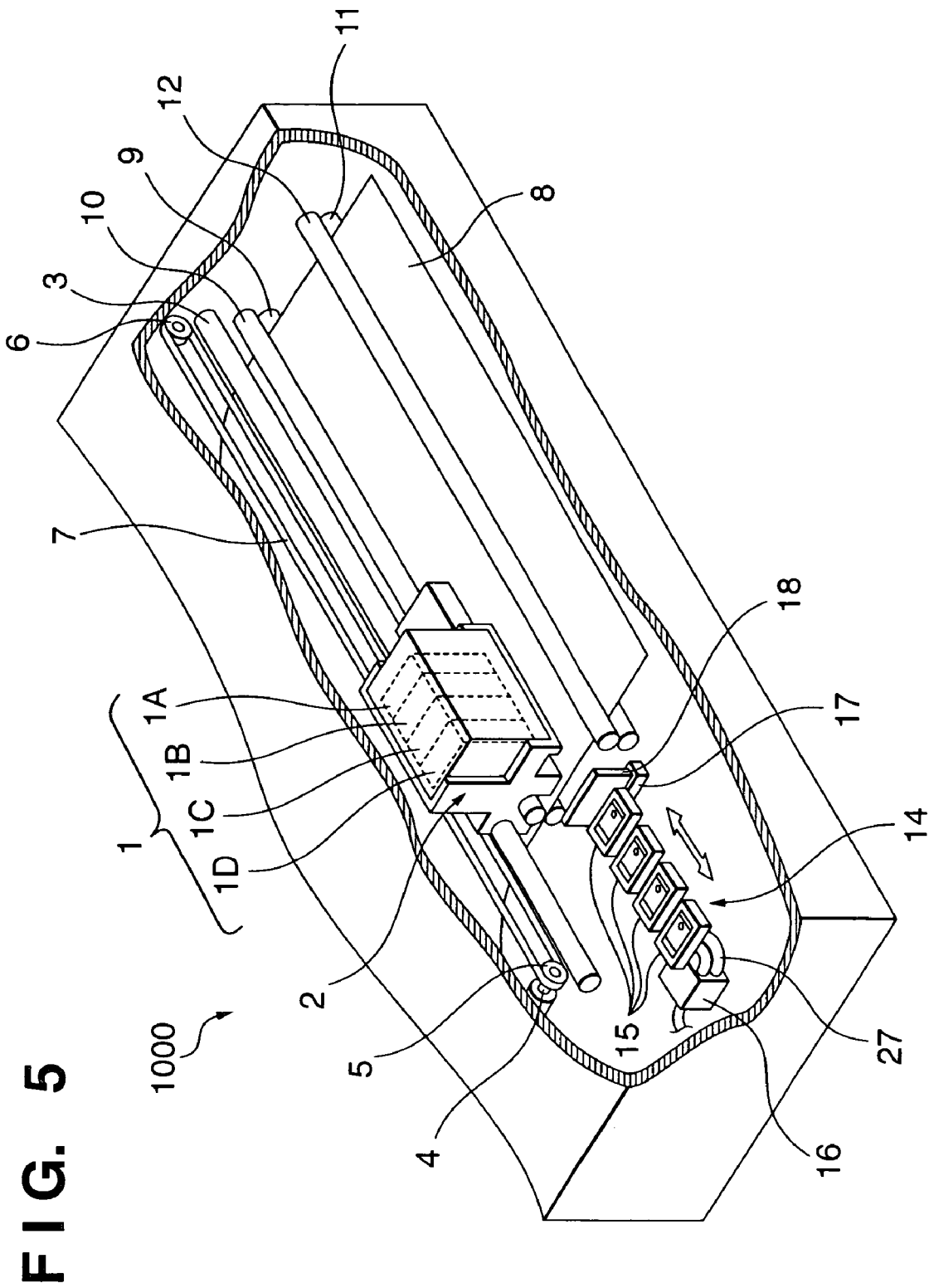
FIG. 5 is a perspective view schematically showing the arrangement of the main part of an ink-jet printing apparatus according to the first embodiment of the present invention.

FIG. 5 is a perspective view schematically showing the arrangement of the main part of an ink-jet printing apparatus according to the first embodiment of the present invention.

In an ink-jet printing apparatus 1000 of FIG. 5, a printhead 1 having a plurality of (four) head cartridges 1A, 1B, 1C, and 1D is exchangeably mounted on a carriage 2. Each of the head cartridges 1A to 1D has a connector for receiving a signal for driving the printhead 1.

In the following description, all or an arbitrary one of the head cartridges 1A to 1D will be simply referred to as the printhead 1.

The head cartridges 1A to 1D of the printhead 1 print with different color inks. The head cartridges 1A to 1D house ink tanks which store different, cyan (C), magenta (M), yellow (Y), and black (Bk) inks. The head cartridges 1A to 1D are positioned and exchangeably mounted on the carriage 2. The carriage 2 has a connector holder (electrical connection portion) for transmitting a driving signal or the like to the head cartridges 1A to 1D via connectors.

The carriage 2 is guided and supported in the moving direction along a guide shaft 3 which is set in the apparatus main body in the main scanning direction. The carriage 2 is driven by a main scanning motor 4 via a motor pulley 5, driven pulley 6, and timing belt 7, and the position and movement of the carriage 2 are controlled.

A recovery portion 14 which performs recovery operation in order to keep a good ink discharge state of the printhead 1 is arranged on the left side of the apparatus main body. The recovery portion 14 comprises ink recovery portions 15 which recover ink discharged from the head cartridges 1A to 1D of the printhead 1, a cap (not shown) which caps the printhead 1, a wiper 18 which wipes the ink discharge surface of the printhead 1, and a suction pump 16 for sucking ink from the ink discharge nozzle of the printhead 1 via a suction nozzle 27. The wiper 18 is stored in a wiper storage portion 17 when not in use.

A printing medium 8 is conveyed (sheet feed) in the sub-scanning direction by rotation of two pairs of convey rollers 9 and 10 and convey rollers 11 and 12 via a position (printing portion) facing the orifice surface of the printhead 1.

The printing medium 8 is supported on its lower surface by a platen (not shown) so as to form a flat printing surface at the printing portion. In this case, the head cartridges 1A to 1D of the printhead 1 mounted on the carriage 2 are held such that their orifice surfaces project from the carriage 2 and become parallel to the printing medium 8 between the two pairs of convey rollers 9 and 10 and convey rollers 11 and 12.

The printhead 1 is an ink-jet printing means for discharging ink by using heat energy, and comprises an electrothermal transducer for generating heat energy. The printhead 1 discharges ink from an orifice to print by using a change in pressure caused by growth and shrinkage of bubbles by film boiling which is generated by heat energy applied by the electrothermal transducer.

The structure of the main part of an ink discharge portion 13 of the printhead 1 will be explained with reference to FIG. 6.

FIG. 6 is a perspective view schematically showing the structure of the main part of the ink discharge portion of the printhead according to the first embodiment of the present invention.

In FIG. 6, a plurality of orifices 22 are formed at a predetermined pitch in an orifice surface 21 which faces the printing medium 8 at a predetermined gap (about 0.5 to 2 [mm]). Each electrothermal transducer (heating resistance element or the like) 25 for generating energy corresponding to an ink discharge amount is arranged along the wall surface of a corresponding channel 24 which communicates a common liquid chamber 23 with each orifice 22.

In the first embodiment, the printhead 1 is mounted on the carriage 2 such that the orifices 22 are aligned in a direction perpendicular to the scanning direction of the carriage 2. The printhead 1 is constituted such that a corresponding electrothermal transducer 25 is driven (energized) on the basis of printing data to film-boil ink in the channel 24, and ink is discharged from the orifice 22 by the generated pressure.

The arrangement of the control circuit of the ink-jet printing apparatus 1000 will be described with reference to FIG. 7.

Figure 7:
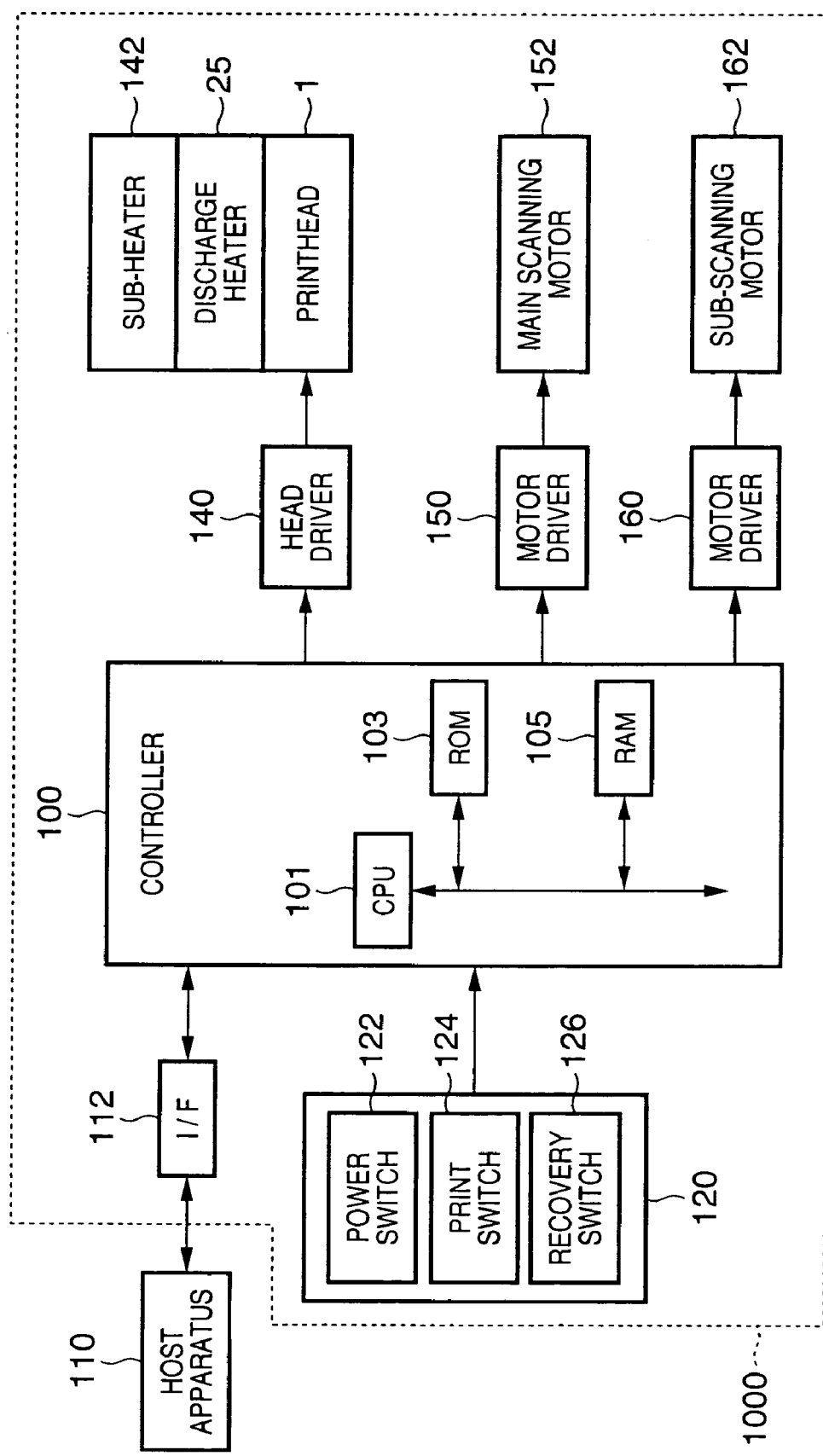
FIG. 7 is a block diagram showing the schematic arrangement of the control circuit of the ink-jet printing apparatus according to the first embodiment of the present invention.

FIG. 7 is a block diagram showing the schematic arrangement of the control circuit of the ink-jet printing apparatus according to the first embodiment of the present invention.

In FIG. 7, a controller 100 is a main control unit, and comprises a CPU 101 in the form of a microcomputer, a ROM 103 which stores various programs including a program for realizing processing executed in each embodiment of the present invention (to be described later), various printing dot management tables, and other fixed data, and a RAM 105 having an area for mapping image data, a work area, and the like. The controller 100 functions as a printhead control unit.

A host apparatus 110 is an image data supply source (e.g., a computer for creating and processing printing data, an image reader, or a digital camera). The host apparatus 110 exchanges image data, other commands, status signals, and the like with the controller 100 via an interface (I/F) 112.

Examples of the interface (I/F) 112 are a USB interface, parallel interface, and IrDA interface.

The host apparatus 110 generates printing data for realizing printing control by the controller 100 of the ink-jet printing apparatus 1000, and controls output of printing data to the controller 100. Generation and output control of printing data are realized by a dedicated program such as a printer driver installed in the host apparatus 110, but may be realized by dedicated hardware which realizes processing executed by the dedicated program.

The host apparatus 110 comprises standard building components (e.g., a CPU, RAM, ROM, hard disk, external memory, network interface, display, keyboard, and mouse) which are mounted in a general-purpose computer.

In the ink-jet printing apparatus 1000, an operation unit 120 is a set of switches for receiving an instruction input by the operator. The operation unit 120 comprises a power switch 122, a switch 124 for designating the start of printing, and a recovery switch 126 for designating activation of suction recovery.

A head driver 140 is a driver which drives the discharge heater 25 of the printhead 1 in accordance with printing data or the like. The head driver 140 has a shift register which aligns printing data in correspondence with the positions of the electrothermal transducers (discharge heaters) 25, a latch circuit which latches data at a proper timing, a logical circuit element which operates the discharge heater in synchronism with a driving timing signal, and a timing setting unit which properly sets the driving timing (discharge timing) for adjusting a dot formation position.

The printhead 1 has a sub-heater 142. The sub-heater 142 performs temperature adjustment for stabilizing the ink discharge characteristic. The sub-heater 142 can be formed on a printhead board at the same time as the discharge heater 25 and/or attached to the main body of the printhead 1 or the head cartridges 1A to 1D.

A motor driver 150 is a driver which drives a main scanning motor 152. A sub-scanning motor 162 is a motor used to convey (sub-scan) the printing medium 8. A motor driver 160 is a driver which drives the sub-scanning motor 162.

Printing dot control executed by the ink-jet printing apparatus 1000 of the first embodiment in order to control an air flow generated near the printing nozzle array will be explained.

(Air Flow Control)

Figure 8:
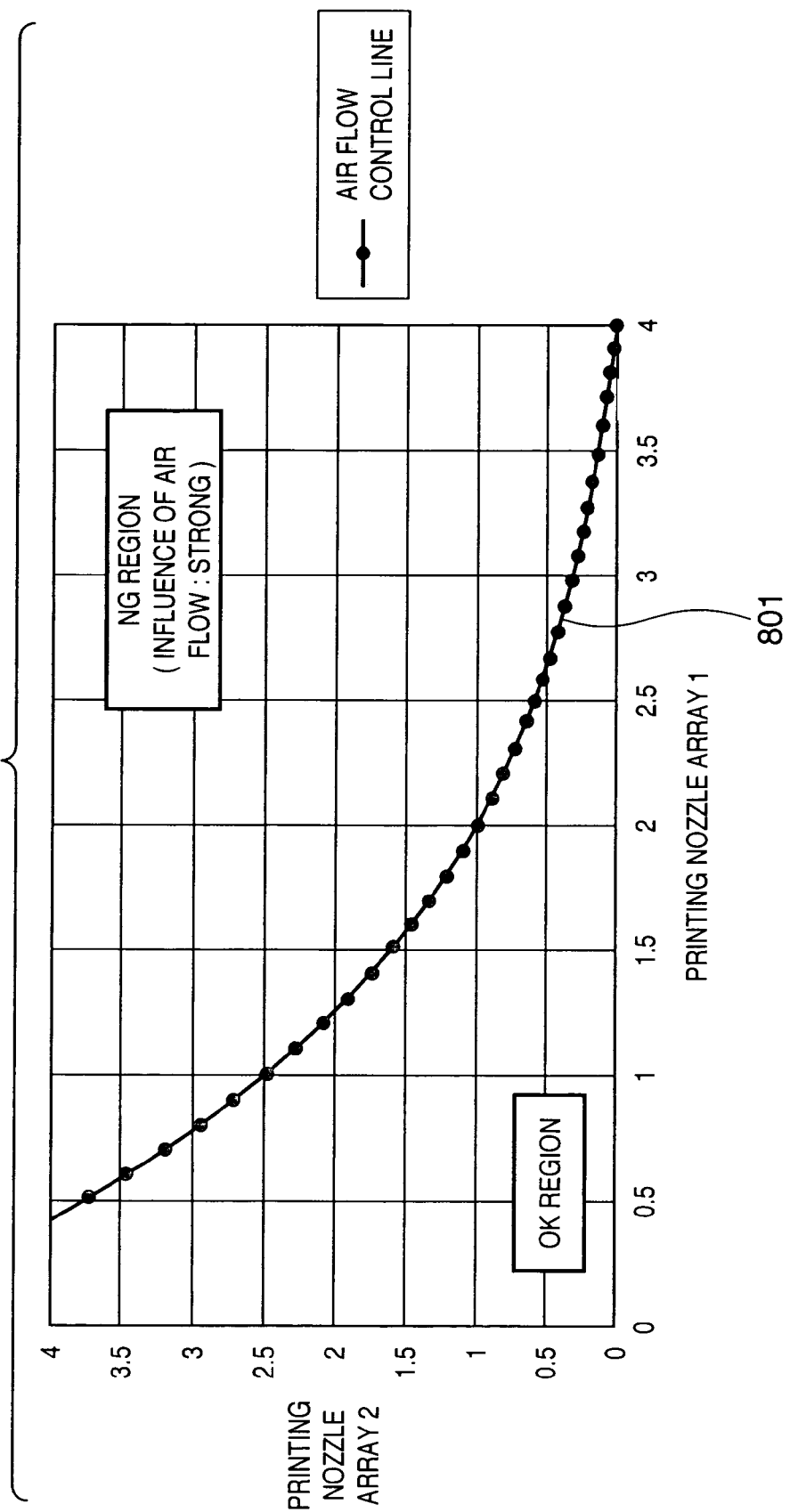
FIG. 8 is a graph showing an example of printing dot control for controlling an air flow when printing is done in each pixel by two neighboring printing nozzle arrays according to the first embodiment of the present invention.

FIG. 8 is a graph showing an example of printing dot control for controlling an air flow when printing is done in each pixel by two neighboring printing nozzle arrays according to the first embodiment of the present invention. The two printing nozzle arrays (first and second printing nozzle arrays) are arranged adjacent to each other in the main scanning direction different from the nozzle array direction.

FIG. 8 shows a printing dot management table for controlling the number of printing dots of printing nozzle array 2 depending on that of printing nozzle array 1 in accordance with an air flow control line 801. A region above the air flow control line 801 of the printing dot management table in FIG. 8 is an NG region where the influence of an air flow by ink discharge of printing nozzle array 1 is strong and the quality of an image on a printing medium is low. The numbers of printing dots of printing nozzle array 1 and printing nozzle array 2 control printing by using a region below the air flow control line 801, i.e., an OK region where the quality of an image on a printing medium is high.

Figure 1:
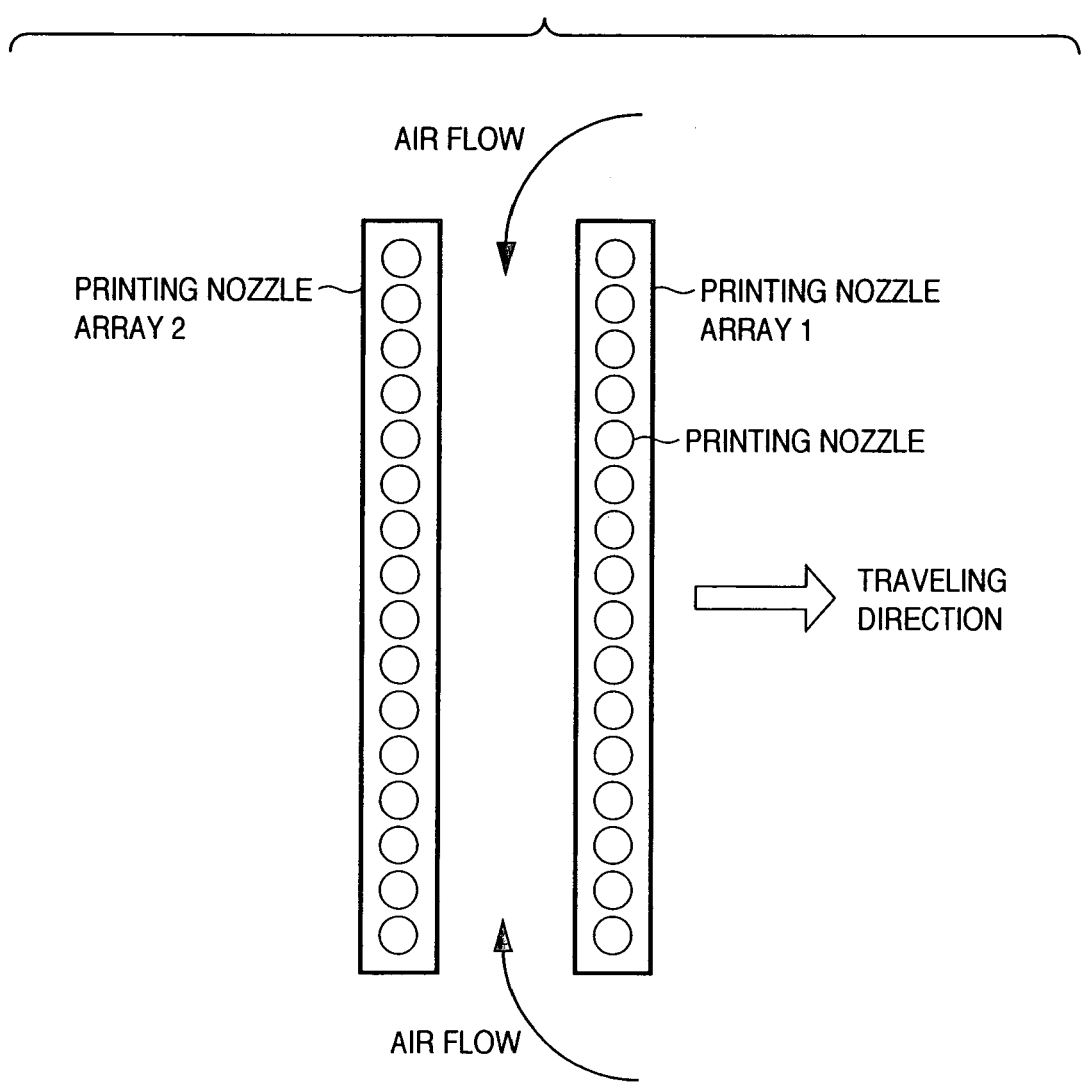
FIG. 1 is a plan view showing the discharge surface of a printhead for explaining generation of an air flow by ink discharge.
Figure 2:
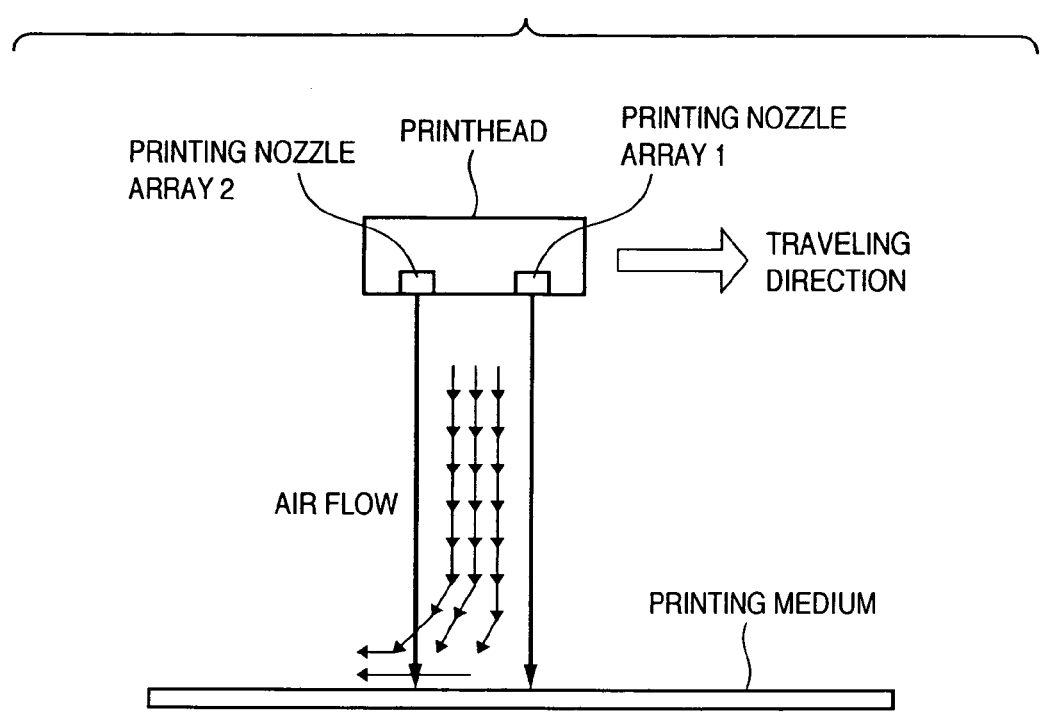
FIG. 2 is a side view showing the printhead for explaining generation of an air flow by ink discharge.
Figure 3:
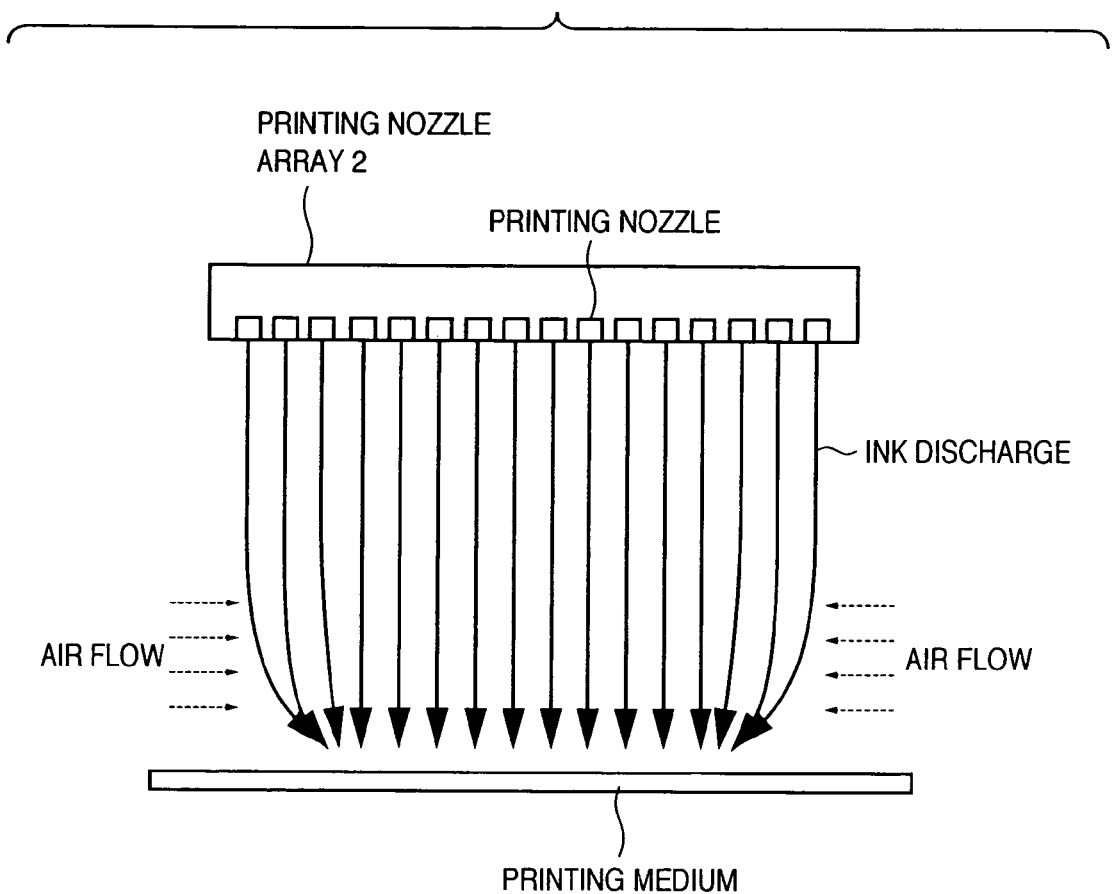
FIG. 3 is a front view showing the printhead in the traveling direction for explaining generation of an air flow by ink discharge.

In this specification, the NG region is defined as a region where landing from an end nozzle shifts under the influence of an air flow, as shown in FIG. 3, and an image error such as a distortion or nonuniformity occurs, i.e., a region where landing of a printing dot from printing nozzle array 2 shifts under the influence of an air flow caused by ink discharge from printing nozzle array 1 in FIG. 8, causing an image error.

More specifically, the NG region is a region where a landing position shift corresponding to one dot occurs between adjacent dots in 1,200-dpi high-density printing using dots of about 30 $\mu$m. The shift amount from the ideal landing position of one dot is measured during one printing/scanning. If the shift amount is about 15 $\mu$m and an adjacent dot similarly shifts by about 15 $\mu$m in the opposite direction, adjacent dots shift by a total of 30 $\mu$m, resulting in an image error.

From this, the NG region is a region where the shift amount from the ideal landing position of one dot is a distance equal to or more than half of the dot diameter (diameter of one dot). To the contrary, the OK region is defined as a region where the influence of an air flow does not exist, or even under the influence of an air flow, an image error such as a distortion or nonuniformity does not occur. The OK region is a region where the shift amount from the ideal landing position of one dot is a distance less than half of the dot diameter when the shift amount from the ideal landing position of one dot is measured during one printing/scanning.

As a concrete example, 1,200-dpi high-density printing using dots of about 30 $\mu$m has been described. The shift amount in the NG or OK region is merely an example in multipass printing, e.g., 4-pass printing on special-purpose paper (trade name: Professional Photo Paper available from Canon). The reference shift amount changes depending on conditions such as the printing density, the number of passes, and the printing medium.

In this manner, according to the first embodiment, printing data for printing nozzle array 1 and printing nozzle array 2 are generated in the range in which the influence of an air flow generated along with ink discharge from printing nozzle array 1 and printing nozzle array 2 is admissible. The range in which the influence of an air flow is admissible is the range of the OK region below the air flow control line 801, in other words, a range in which the shift amount from the ideal landing position of a dot is a distance less than half of the dot diameter regardless of the influence of an air flow.

FIG. 8 shows the number of printing dots for one pixel, and the same control can also be performed even with the average number of printing dots in a plurality of pixels. The same control can also be done using the printing ratio per unit time or the average number of printing dots in a printing pixel per unit time.

Figure 9:
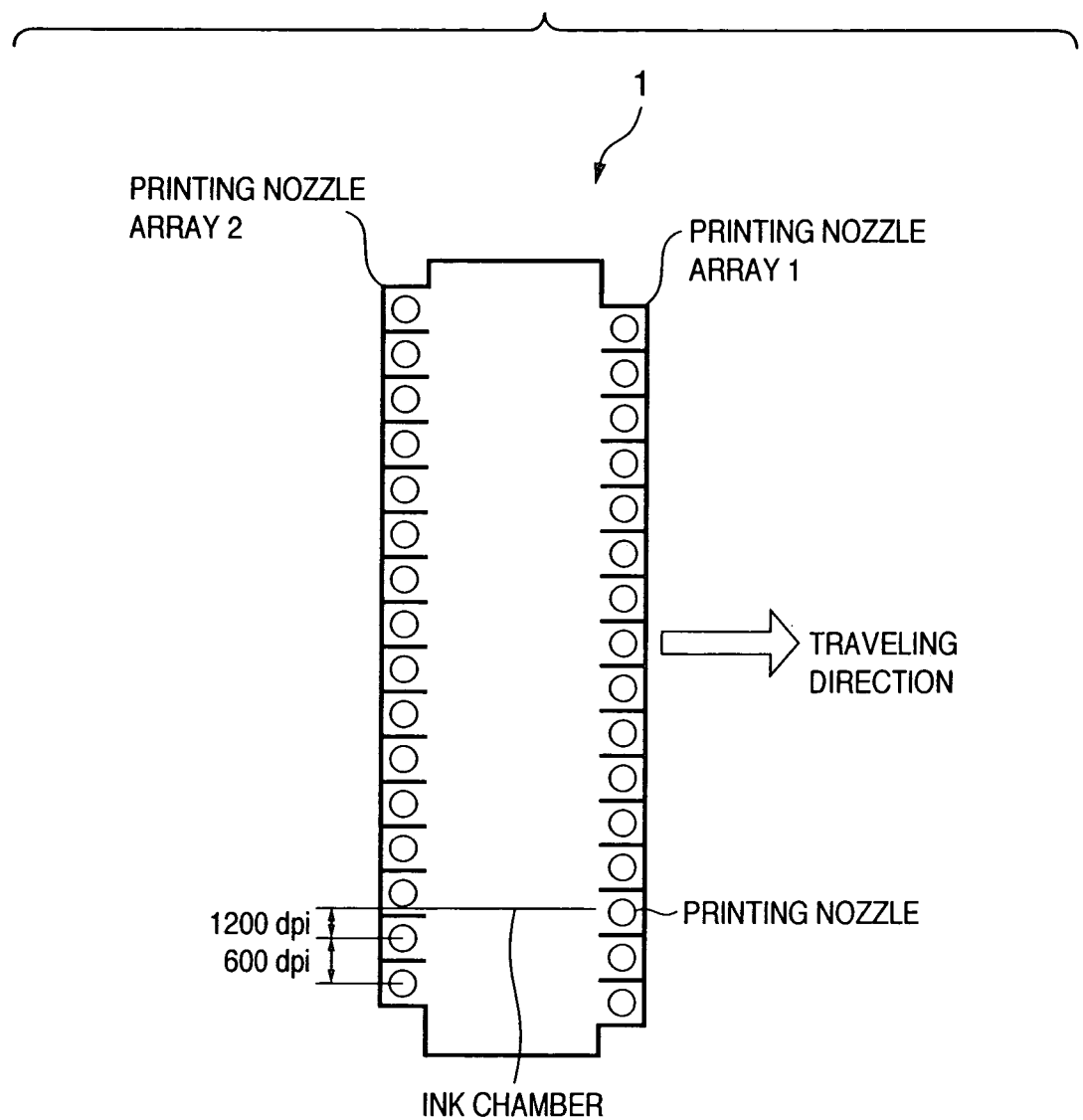
FIG. 9 is a view showing an example of the arrangement of the printing nozzle arrays of the printhead according to the first embodiment of the present invention.

FIG. 9 is a view showing an example of the arrangement of the printing nozzle arrays of the printhead according to the first embodiment of the present invention.

In FIG. 9, while the printhead 1 moves in the traveling direction, it prints by discharging ink of the same color from the printing nozzles of printing nozzle array 1 and printing nozzle array 2. The positional relationship between printing nozzle array 1 and printing nozzle array 2 will be described. Nozzles are arrayed at an interval of 600 dpi in each printing nozzle array, and printing nozzle array 1 and printing nozzle array 2 are respectively arranged on the right and left sides of the ink chamber. The position of printing nozzle array 2 is vertically shifted by 1,200 dpi from printing nozzle array 1 to constitute the printhead 1 having a nozzle pitch of 1,200 dpi.

Figure 10:
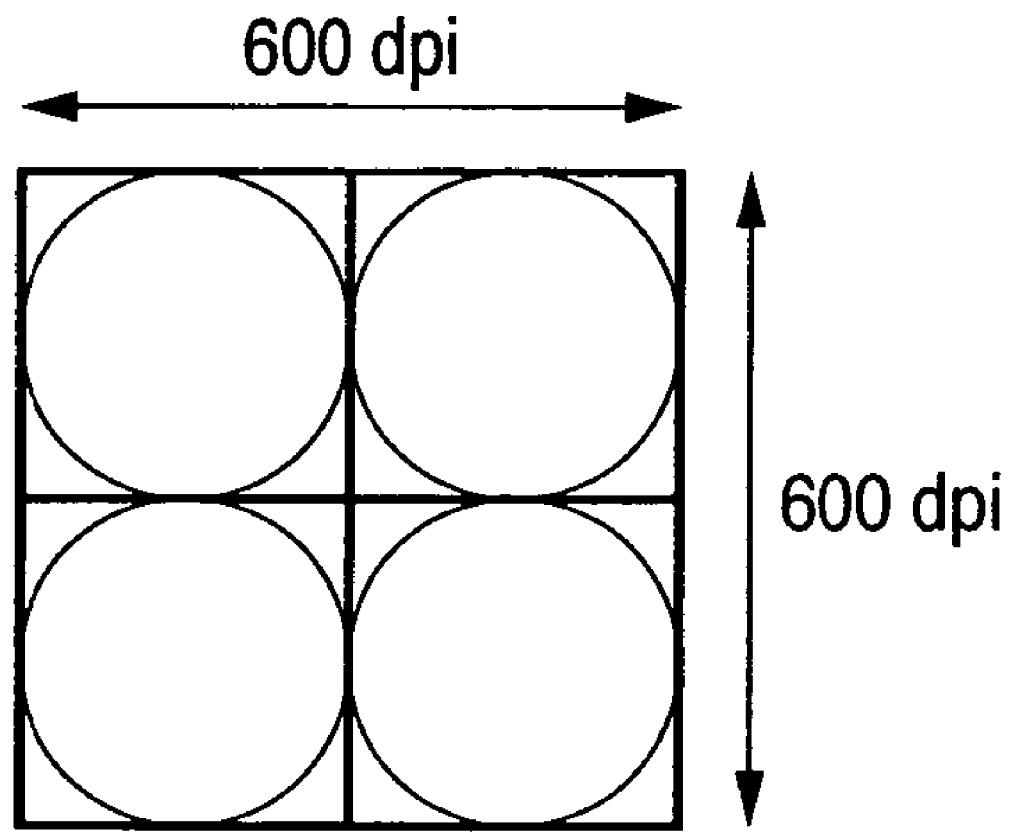
FIG. 10 is a view showing an example of the arrangement of dots which form one pixel by using the printhead according to the first embodiment of the present invention.

FIG. 10 is a view showing an example of the arrangement of dots which form one pixel by using the printhead according to the first embodiment of the present invention.

In this case, one pixel is formed by zero to four dots. Note that FIG. 10 illustrates a case wherein one pixel is formed by a maximum number of dots, i.e., four dots. More specifically, data in image processing is processed at 600 dpi, and multilevel information is generated for one pixel. The ink-jet printing apparatus 1000 sets the number of dots to be printed by a plurality of nozzles corresponding to a target pixel on the basis of the multilevel information.

In FIG. 10, one pixel at 600 dpi is so formed as to allow printing two dots in the vertical direction and two dots in the horizontal direction. That is, an image is formed by a maximum number of four dots in one pixel. This is merely an example, and the number of dots which form one pixel changes depending on the characteristics of the ink-jet printing apparatus 1000 and printhead 1.

Several methods of realizing printing dot control will be described.

A case wherein printing data for controlling a printing dot is generated in the host apparatus 110 will be explained.

In this case, the printer driver generates printing data of binary or multilevel information printable by the ink-jet printing apparatus 1000 on the basis of image data which is generated by an application running in the host apparatus 110 and is to be printed. In the printer driver, target image data is processed for each pixel. The printer driver independently generates printing data corresponding to printing nozzle array 1 and printing nozzle array 2.

More specifically, when printing data is to be generated for each pixel, printing dots for expressing the pixel are determined on the basis of the air flow control line 801 in FIG. 8. For example, when three printing dots are necessary to express the tone of a given pixel, a combination of three printing dots is selected within the OK region below the air flow control line 801 from printing dots to be discharged from printing nozzle array 1 and printing nozzle array 2.

In FIG. 8, a combination of three printing dots in the OK region below the air flow control line 801 is made up of, e.g., two dots from printing nozzle array 1 and one dot from printing nozzle array 2. In addition to this, any combination of three printing dots can be selected within the OK region below the air flow control line 801.

Printing data corresponding to each of printing nozzle array 1 and printing nozzle array 2 is generated in a range in which the sum of the number of dots to be printed by printing nozzle array 1 and the number of dots to be printed by printing nozzle array 2 adjacent to printing nozzle array 1 does not exceed a predetermined number (number of dots along the air flow control line 801). Image data corresponding to a plurality of printing nozzle arrays capable of suppressing an air flow generated between printing nozzle array 1 and printing nozzle array 2 can be independently generated.

The predetermined number corresponds to the number of dots on the air flow line 801, and is a maximum number of printing dots with which the influence of an air flow generated along with ink discharge from printing nozzle array 1 and printing nozzle array 2 is admissible.

Various combinations of printing dots are conceivable as far as they fall within the OK region determined by the air flow control line of the printing dot management table. In terms of suppressing an air flow, the first ink amount (number of dots) discharged from printing nozzle array 1 by one discharge and the second ink amount (number of dots) discharged from printing nozzle array 2 by one discharge are preferably different from each other. In addition, the first ink amount is preferably larger than the second one.

A case wherein the ink-jet printing apparatus 1000 generates printing data for controlling printing dots, on the basis of image data which is generated by the host apparatus 110 and is to be printed will be described. Index control will be explained as an example of generating printing data for controlling printing dots by the ink-jet printing apparatus 1000.

In index control, a plurality of combinations of printing dots are generated from one multilevel information (tone information) to express the tone of one pixel. FIG. 11 shows an example of index control. Similar to FIG. 10, one pixel is so formed as to allow printing a total of four dots, i.e., two dots in the vertical direction and two dots in the horizontal direction. Printing dots have two, large and small sizes, a large dot is represented by 5 ng, and a small dot is represented by 2 ng. Image data of multilevel information received from the host apparatus 110 is 3-bit, i.e., eight-valued tone information (eight gray levels from Level 0 to 7). A combination of dots which form one pixel is determined in accordance with the tone information (Level 0 to 7).

In FIG. 11, as the gray level increases, small dots are first added one by one, and then large dots replace small dots, expressing eight gray levels without degrading the tone quality.

Assuming that dots printed by printing nozzle array 1 in FIG. 8 or 9 are large dots and dots printed by printing nozzle array 2 are small dots, large and small dots are used in the OK region below the air flow control line 801 of FIG. 8 in an example of index control shown in FIG. 11. In other words, in index control, a combination of printing dots to be discharged from printing nozzle array 1 and printing nozzle array 2 can be determined while satisfying the OK region below the air flow control line 801 of the printing dot management table in FIG. 8, i.e., realizing air flow control. Even in index control, printing data corresponding to each of printing nozzle array 1 and printing nozzle array 2 can be generated in a range in which the sum of the number of dots to be printed by printing nozzle array 1 and the number of dots to be printed by printing nozzle array 2 does not exceed a predetermined number (number of dots along the air flow control line 801).

A case wherein printing data for controlling printing dots is generated in the host apparatus 110 (method of generating independent printing data for a plurality of printing nozzle arrays) and a case (index control) wherein printing data for controlling printing dots is generated in the ink-jet printing apparatus 1000 will be compared.

The former method is highly versatile, has a merit of realizing various combinations, and is effective for strict image generation. The latter method cannot provide various combinations of printing dots, obtains only simple combinations, but can reduce the image data amount. Which of the methods is used is determined in accordance with the feature of the printing apparatus, and the same air flow control can be executed in the two methods.

Of the two printing data generation methods, the former is realized by the host apparatus 110, and the latter is realized by the ink-jet printing apparatus 1000. However, the present invention is not limited to this, and the methods may be executed by at least either of the host apparatus 110 and ink-jet printing apparatus 1000 on the basis of various conditions such as the performance of the host apparatus 110, that of the ink-jet printing apparatus 1000, and the printing mode. Alternatively, processing contents may be distributed and cooperatively executed between the two apparatuses.

An example of air flow control in multipass printing in which printing is completed by scanning a predetermined printing region by the printhead a plurality of number of times will be explained as a modification to air flow control.

Figure 12:
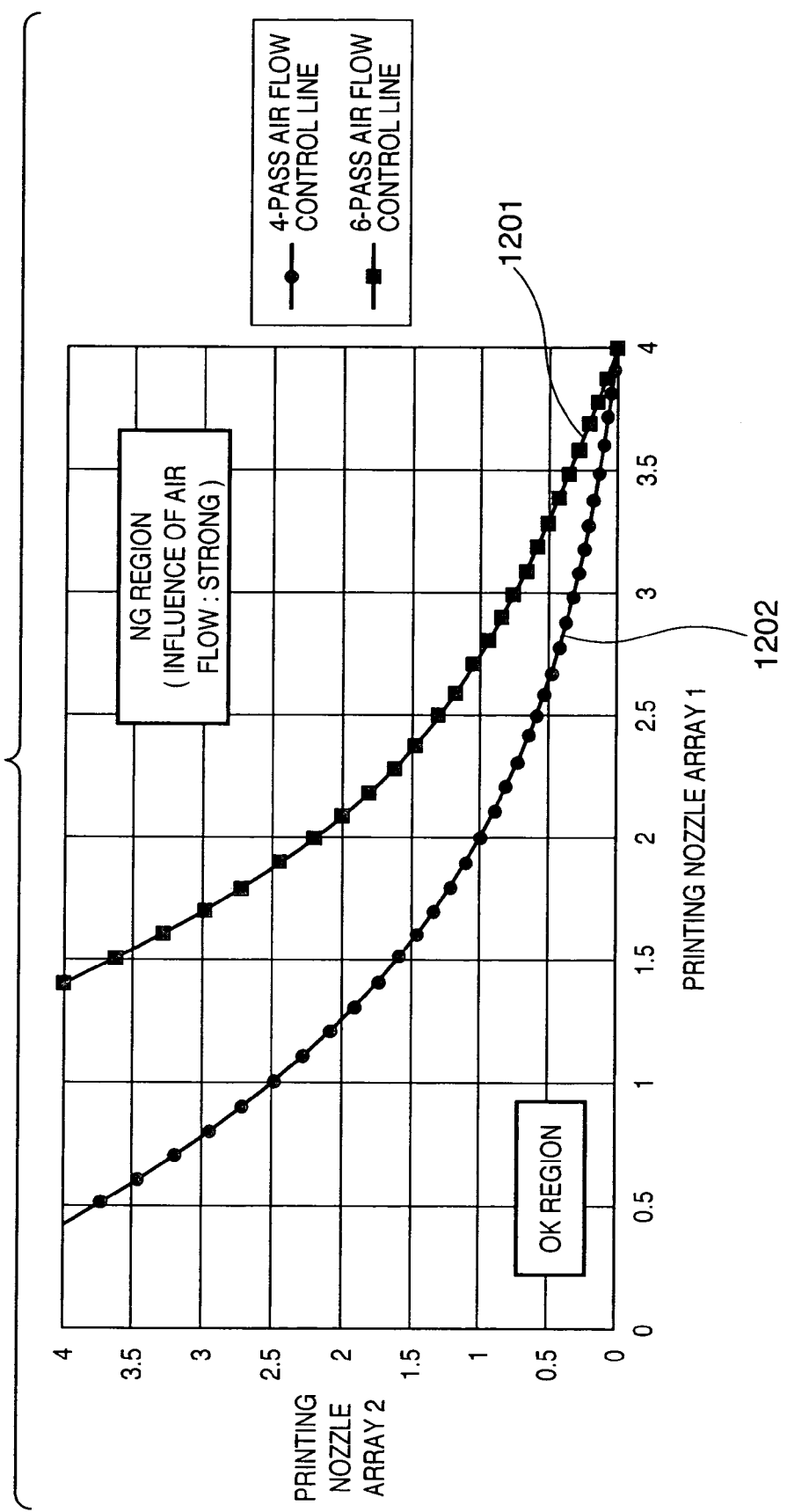
FIG. 12 is a graph showing an example of printing dot control for controlling an air flow in 4-pass printing and 6-pass printing according to the first embodiment of the present invention.

FIG. 12 is a graph showing an example of printing dot control for controlling an air flow in 4-pass printing and 6-pass printing according to the first embodiment of the present invention.

Similar to FIG. 8, FIG. 12 shows an example of printing dot control for controlling an air flow when printing is done in each pixel by two neighboring printing nozzle arrays. The number of printing dots of printing nozzle array 1 and that of printing nozzle array 2 are controlled in accordance with air flow control lines 1201 and 1202.

In FIG. 12, a region above the 6-pass air flow control line 1201 in 6-pass printing or a region above the 4-pass air flow control line 1202 in 4-pass printing is an NG region where the influence of an air flow by ink discharge of printing nozzle array 1 is strong and the quality of an image on a printing medium is low. The number of printing dots of printing nozzle array 2 controls printing by using a region below the 6-pass air flow control line 1201 in 6-pass printing or a region below the 4-pass air flow control line 1202 in 4-pass printing, i.e., an OK region where the quality of an image on a printing medium is high.

Even if the same number of dots are printed in one pixel in 4-pass printing and 6-pass printing, the printing ratio in one printing/scanning is different between them. More specifically, the printing ratio of 6-pass printing is lower than that of 4-pass printing. In 6-pass printing in which printing is performed at a relatively low printing ratio, the influence of an air flow is weaker than in 4-pass printing, and the limit line of the air flow control line 1201 is set high to ensure a wide OK region. In this manner, the air flow control condition (air flow control line) is changed for each printing mode (4- or 6-pass printing), and control suitable for the printing mode can be executed.

As described above, according to the first embodiment, in ink-jet printing of printing by discharging ink onto a printing medium from the printing nozzles of a printhead having a plurality of printing nozzle arrays, the influence of an air flow by ink discharge can be suppressed by controlling for each pixel the numbers of dots to be discharged from a plurality of neighboring printing nozzle arrays. Control optimum for printing using a plurality of printing nozzle arrays can be achieved to realize high-image-quality printing.

[Second Embodiment]

The second embodiment is related to ink-jet printing that discharges a plurality of types of inks onto a printing medium from the printing nozzles of a printhead having a plurality of printing nozzle arrays. Especially in the second embodiment, the influence of an air flow by ink discharge is suppressed by controlling the numbers of dots to be discharged from a plurality of neighboring printing nozzle arrays in printing with different inks.

Figure 13:
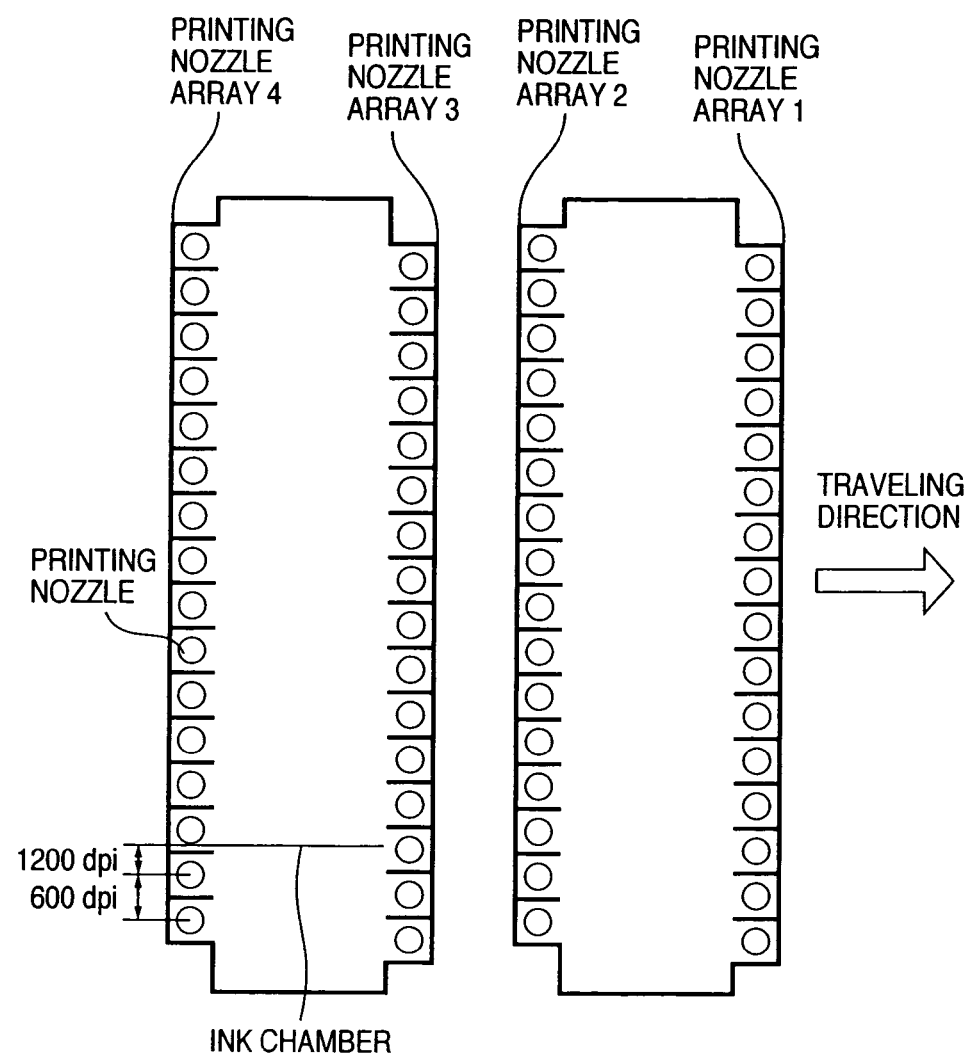
FIG. 13 is a view showing an example of the arrangement of the printing nozzle arrays of a printhead according to the second embodiment of the present invention.

FIG. 13 is a view showing an example of the arrangement of the printing nozzle arrays of the printhead according to the second embodiment of the present invention.

In FIG. 13, while a printhead having printing nozzle array 1 and printing nozzle array 2 and a printhead having printing nozzle array 3 and printing nozzle array 4 move in the traveling direction, the printheads print by discharging ink from the printing nozzles of printing nozzle array 1 to printing nozzle array 4. In FIG. 13, two printheads identical to the printhead 1 in FIG. 9 are arranged side by side in the main scanning direction, and printing nozzles are arrayed at an interval of 600 dpi on the right and left sides of each ink chamber. The positions of the right and left printing nozzle arrays are vertically shifted by 1,200 dpi to constitute a printhead having a nozzle pitch of 1,200 dpi.

The arrangement of dots which form one pixel is the same as that in the first embodiment. As shown in FIG. 10, one pixel at 600 dpi is formed by a maximum number of two dots in the vertical direction and two dots in the horizontal direction, and an image is formed by a maximum number of four dots in one pixel.

Figure 14:
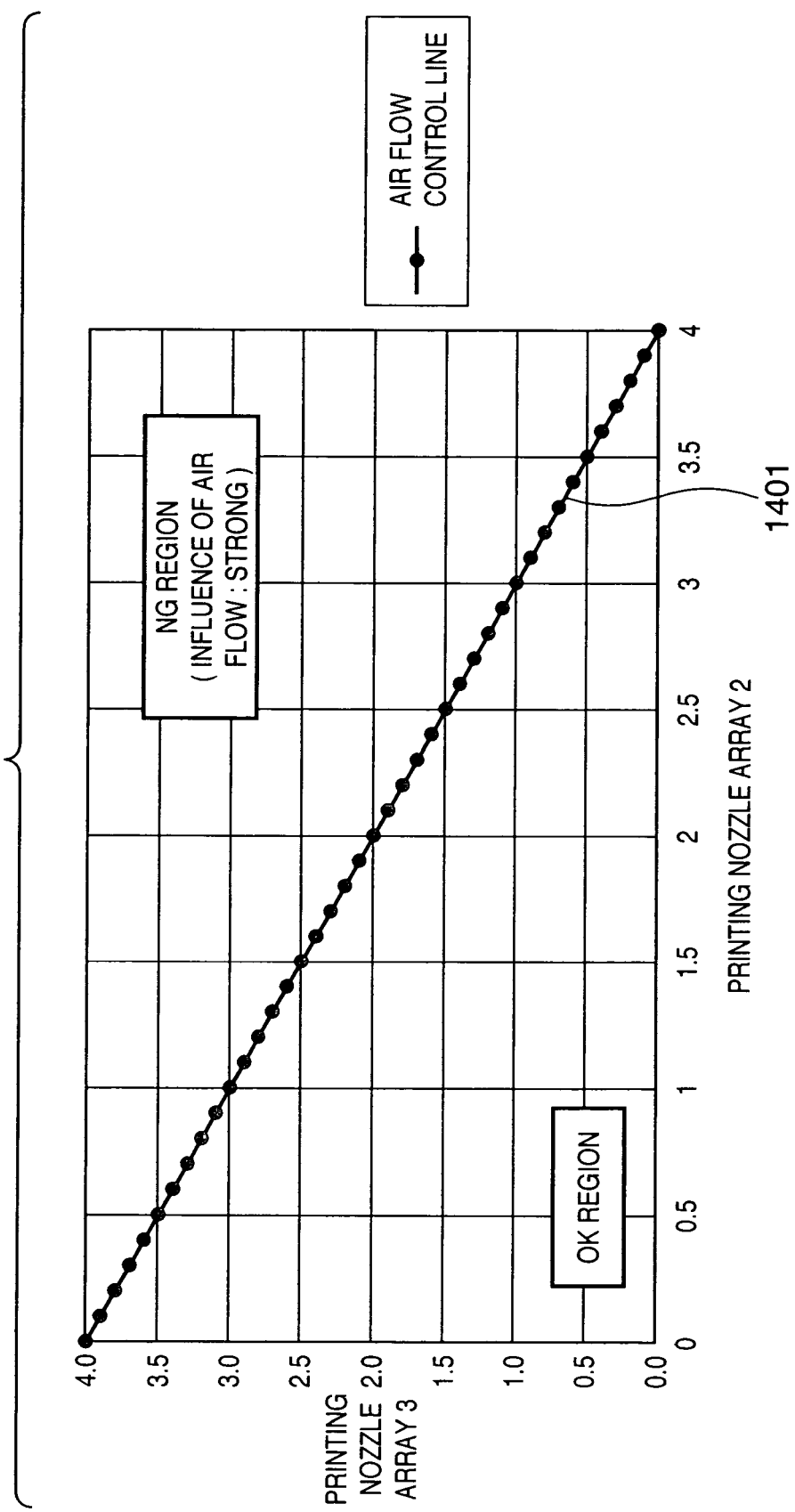
FIG. 14 is a graph showing an example of printing dot control for controlling an air flow when printing is done by two neighboring printing nozzle arrays according to the second embodiment of the present invention.

FIG. 14 is a graph showing an example of printing dot control for controlling an air flow when printing is done in each pixel by two neighboring printing nozzle arrays according to the second embodiment of the present invention.

In FIG. 14, the number of printing dots of printing nozzle array 3 is controlled in accordance with that of printing nozzle array 2. A region above an air flow control line 1401 of FIG. 14 is an NG region where the influence of an air flow by ink discharge of printing nozzle array 2 is strong and the quality of an image on a printing medium is low. The number of printing dots of printing nozzle array 3 controls printing by using a region below the air flow control line 1401, i.e., an OK region where the quality of an image on a printing medium is high.

With the arrangement of the printhead in FIG. 13, printing by printing nozzle array 3 can be performed by printing nozzle array 4. Alternatively, printing nozzle array 1 may replace printing nozzle array 2 in order to suppress ink discharge of printing nozzle array 2 that generates an air flow.

In this example, attention is given to neighboring printing nozzle array 2 and printing nozzle array 3. The interval between printing nozzle array 1 and printing nozzle array 4 is large, and no influence of an air flow appears. The influence of an air flow by discharge of printing nozzle array 1 on printing nozzle array 3, and that of an air flow by discharge of printing nozzle array 2 on printing nozzle array 4, or opposite influences can also be ignored.

From this, attention is given to the numbers of printing dots of the closest printing nozzle array 2 and printing nozzle array 3 in which the influence of an air flow is considered to be strong. In a region where image degradation under the influence of an air flow is predicted, control is so executed as to use an alternative printing nozzle array. An image is formed in the OK region where the influence of an air flow is weak.

A method of generating printing data for controlling printing dots is the same as that in the first embodiment. Image data are independently generated for printing nozzle array 2 and printing nozzle array 3, or index control as shown in FIG. 11 is adopted.

Generation of image data for controlling printing dots targets printing nozzle array 2 and printing nozzle array 3, but may be executed for printing nozzle array 1, printing nozzle array 2, printing nozzle array 3, and printing nozzle array 4. That is, the design matter includes proper generation of printing data for controlling printing dots for adjacent printing nozzle arrays in accordance with the application and purpose.

As described above, according to the second embodiment, in ink-jet printing that discharges a plurality of types of inks onto a printing medium from the nozzles of a printhead having a plurality of printing nozzle arrays, the influence of an air flow by ink discharge can be suppressed by controlling for each pixel the numbers of dots to be discharged from a plurality of neighboring printing nozzle arrays. Optimum control for printing using a plurality of printing nozzle arrays can be achieved to realize high-image-quality printing.

[Third Embodiment]

The third embodiment is related to ink-jet printing that discharges ink onto a printing medium from the nozzles of a printhead having a plurality of printing nozzle arrays. Especially in the third embodiment, the influence of an air flow by ink discharge is suppressed by controlling for each pixel the numbers of dots to be discharged from a plurality of neighboring printing nozzle arrays by using a plurality of printing nozzle arrays in which printing nozzles for discharging a plurality of ink amounts are arrayed.

Figure 15:
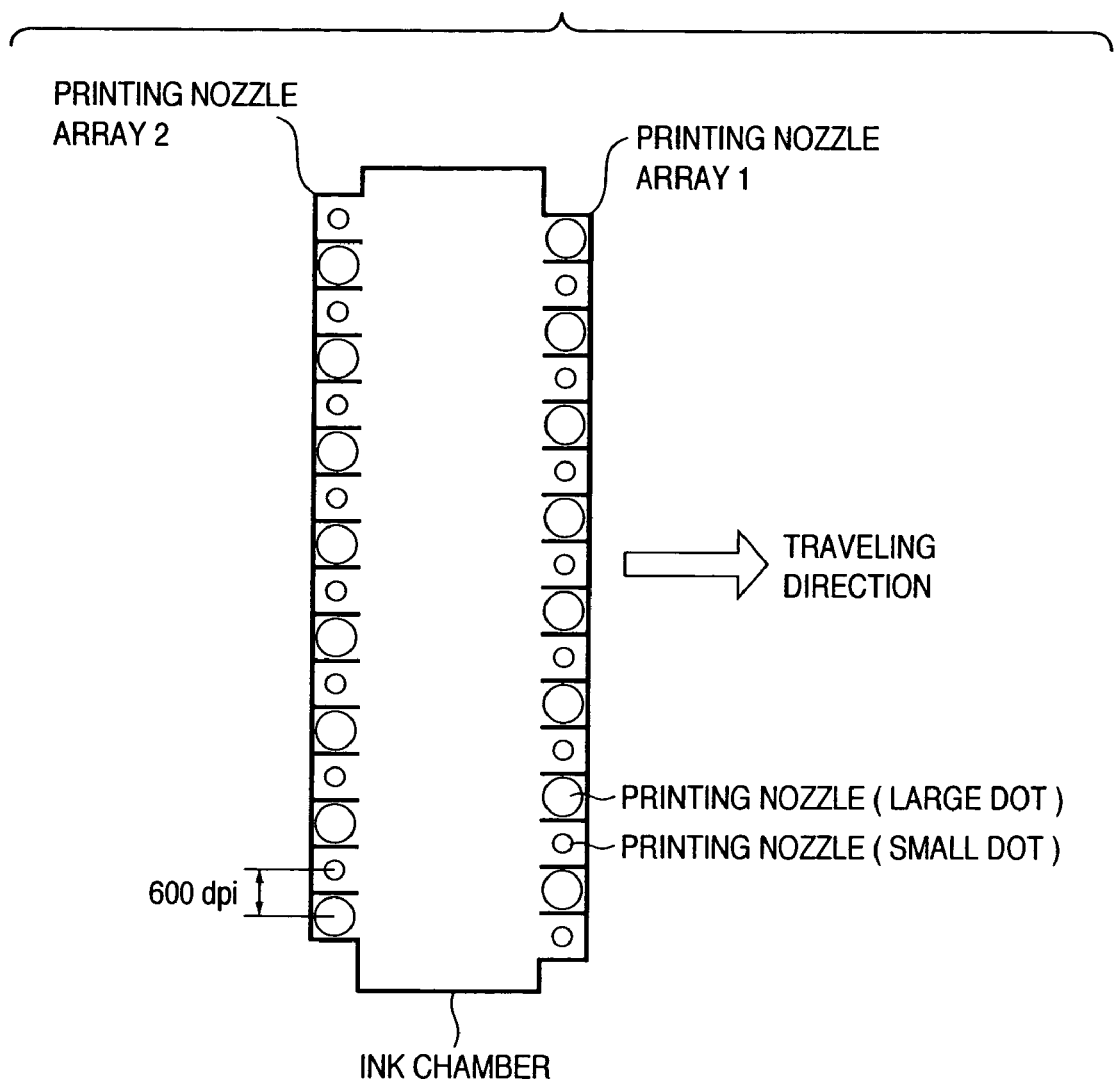
FIG. 15 is a view showing an example of the arrangement of the printing nozzle arrays of a printhead according to the third embodiment of the present invention.

FIG. 15 is a view showing an example of the arrangement of the printing nozzle arrays of the printhead according to the third embodiment of the present invention.

In FIG. 15, while the printhead moves in the traveling direction, the printhead prints by discharging ink from the printing nozzles of printing nozzle array 1 and printing nozzle array 2. The positional relationship between printing nozzle array 1 and printing nozzle array 2 will be described. Nozzles are arrayed at an interval of 600 dpi in printing nozzle array 1 and printing nozzle array 2, and printing nozzle array 1 and printing nozzle array 2 are respectively arranged on the right and left sides of the ink chamber.

Large- and small-dot printing nozzles are alternately arrayed in printing nozzle array 1 and printing nozzle array 2. The positions of large- and small-dot printing nozzles are shifted in printing nozzle array 1 and printing nozzle array 2. That is, the printhead is constituted as a printhead having large and small dots at a nozzle pitch of 600 dpi.

Figure 16:
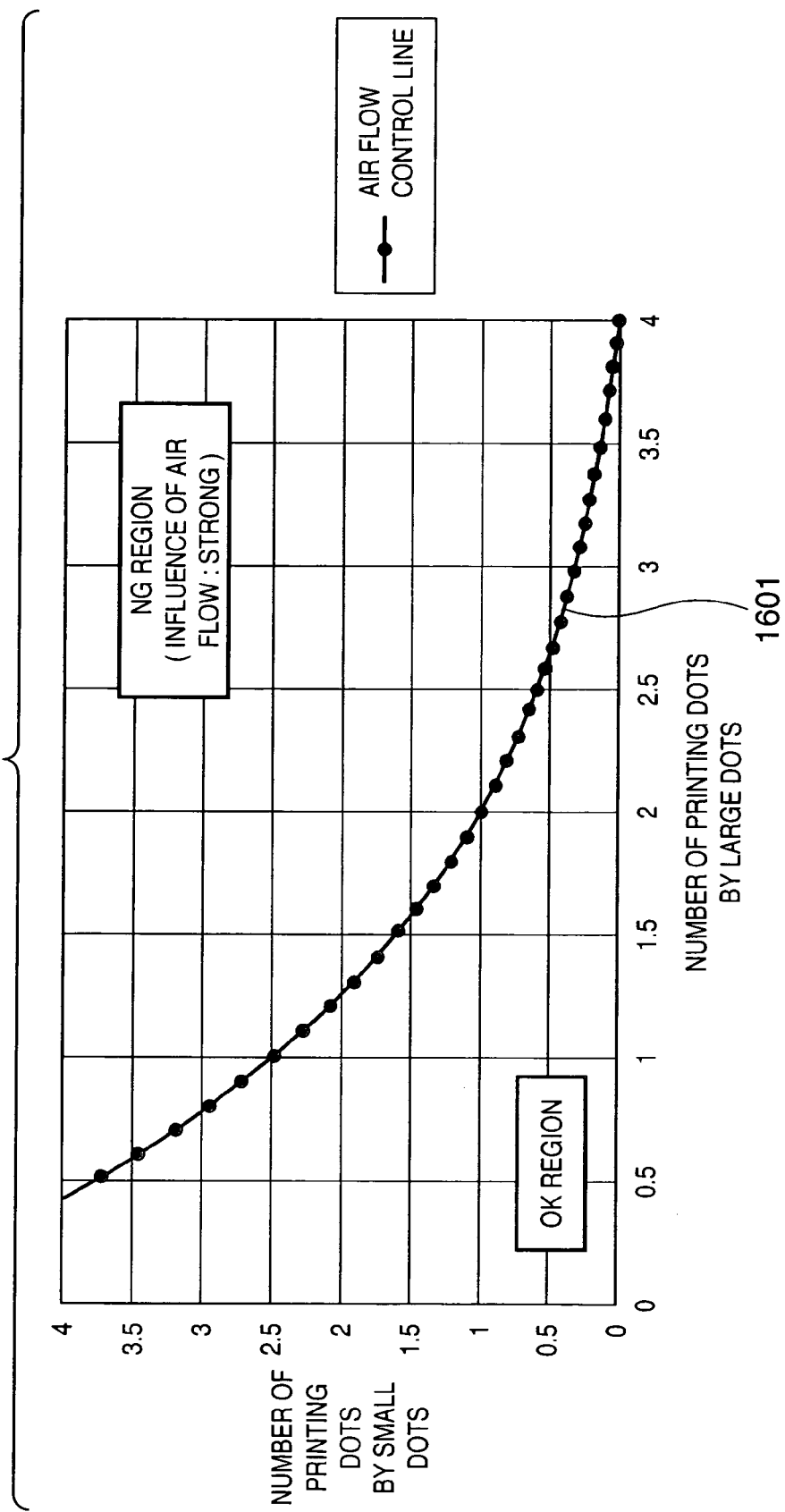
FIG. 16 is a graph showing an example of printing dot control for controlling an air flow when printing is done by two neighboring printing nozzle arrays in which large and small dots coexist according to the third embodiment of the present invention.

FIG. 16 is a graph showing an example of printing dot control for controlling an air flow when printing is done in each pixel by two neighboring printing nozzle arrays in which large and small dots coexist according to the third embodiment of the present invention.

In FIG. 16, the number of printing dots by small dots is controlled in accordance with that of printing dots by large dots. A region above an air flow control line 1601 of FIG. 16 is an NG region where the influence of an air flow by ink discharge of large dots is strong and the quality of an image on a printing medium is low. The number of printing dots by small dots controls printing by using a region below the air flow control line 1601, i.e., an OK region where the quality of an image on a printing medium is high.

A method of generating printing data for controlling printing dots is the same as that in the first embodiment. Image data are independently generated for large and small dots, or index control as shown in FIG. 11 is adopted.

In the third embodiment, not an air flow is controlled for each printing nozzle array, but printing dots are controlled for each printing nozzle having a different discharge amount in a printing nozzle array in which printing nozzles having different discharge amounts are alternately arrayed.

As described above, according to the third embodiment, in ink-jet printing that discharges ink onto a printing medium from the nozzles of a printhead having a plurality of printing nozzle arrays, the influence of an air flow by ink discharge can be suppressed by controlling for each pixel the numbers of dots to be discharged from a plurality of neighboring printing nozzle arrays by using a plurality of printing nozzle arrays in which printing nozzles for discharging a plurality of ink amounts are arrayed. Accordingly, optimum control for printing using a plurality of nozzles with a plurality of ink discharge amounts can be achieved to realize high-image-quality printing.

Processing of generating printing data for controlling printing dots, which is realized in each embodiment of the present invention, will be explained with reference to FIG. 17.

Figure 17:
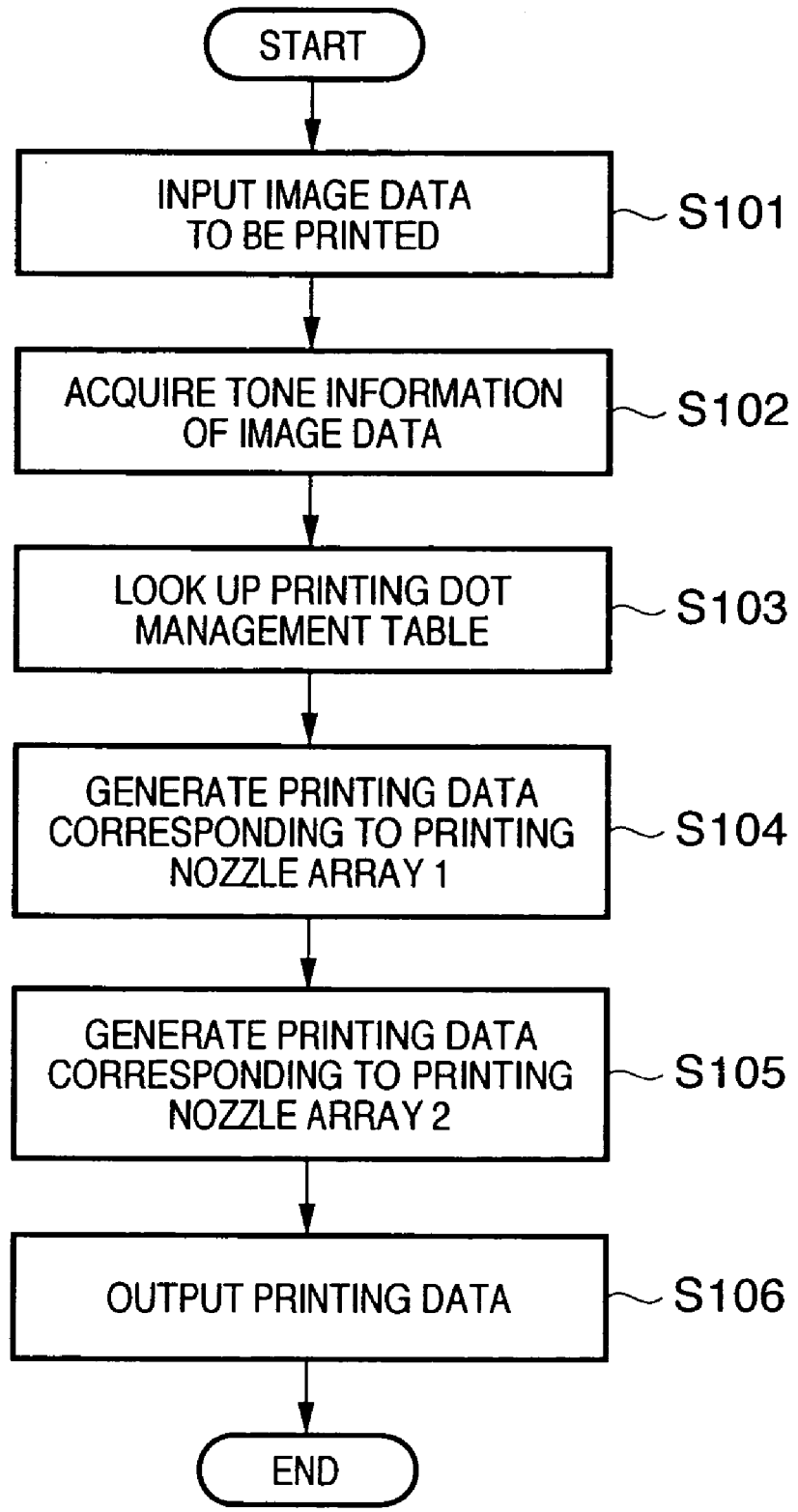
FIG. 17 is a flow chart showing the schematic flow of processing of generating printing data for controlling printing dots, which is realized in each embodiment of the present invention.

FIG. 17 is a flow chart showing the schematic flow of processing of generating printing data for controlling printing dots, which is realized in each embodiment of the present invention.

For descriptive convenience, the first embodiment will be exemplified in FIG. 17. As for the second and third embodiments, processing realized by each embodiment can be executed by changing the processing target and conditions.

In step S101, image data to be printed is input.

"Input" means input of image data generated by the image processing application of the host apparatus 110 to the printer driver when subsequent processing is executed by the printer driver in the host apparatus 110. Also, "input" means input of image data generated by the image processing application of the host apparatus 110 to the ink-jet printing apparatus 1000 when subsequent processing is executed in the ink-jet printing apparatus 1000.

Subsequent processing is realized by the printer driver or the controller 100 of the ink-jet printing apparatus 1000.

In step S102, tone information of image data is acquired. In step S103, the printing dot management table is looked up on the basis of the acquired tone information.

In steps S104 and S105, a combination of printing dots to be discharged from printing nozzle array 1 and printing nozzle array 2 that satisfies the OK region of the air flow control line of the printing dot management table is determined by looking up the printing dot management table. Printing data corresponding to each printing nozzle array is generated.

In step S106, the generated printing dot is output to an output destination (ink-jet printing apparatus 1000 or head driver 140).

The above processing is merely an example. When index control described in the first embodiment with reference to FIG. 11 is to be executed, a combination of large dots to be discharged from printing nozzle array 1 and small dots to be discharged from printing nozzle array 2 is determined by looking up the printing dot management table on the basis of tone information (Level 0 to 7) of image data in steps S104 and S105. Printing data corresponding to each printing nozzle array is generated.

The same processing can also be performed by creating a table for determining printing dots to be discharged from printing nozzle array 1 and printing nozzle array 2 for each gray level, and holding the table in the printer driver or ink-jet printing apparatus 1000.

The present invention is particularly effective in, of ink-jet printing systems, a printhead and printing apparatus of a system which comprises a means (e.g., an electrothermal transducer or laser beam) for generating heat energy as energy utilized to discharge ink and changes the ink state by heat energy. This system can increase the printing density and resolution.

As a representative arrangement or principle, the present invention preferably adopts the basic principle disclosed in, e.g., U.S. Pat. Nos. 4,723,129 or 4,740,796.

This system is applicable to both a so-called on-demand apparatus and continuous apparatus. The system is particularly effective for the on-demand apparatus because of the following reason. That is, at least one driving signal which corresponds to printing information and gives a rapid temperature rise exceeding nuclear boiling is applied to an electrothermal transducer arranged in correspondence with a sheet or liquid channel holding a liquid (ink). This signal causes the electrothermal transducer to generate heat energy, and causes film boiling on the heat effecting surface of the printhead. Consequently, a bubble can be formed in the liquid (ink) in one-to-one correspondence with the driving signal. Growth and shrinkage of the bubble discharge the liquid (ink) from an orifice, forming at least one droplet. The driving signal more preferably has a pulse shape because a bubble grows and shrinks instantaneously at an appropriate timing to discharge the liquid (ink) with high response. The pulse-like driving signal is preferably a signal disclosed in U.S. Pat. Nos. 4,463,359 or 4,345,262. Conditions disclosed in U.S. Pat. No. 4,313,124 which is an invention concerning the temperature rise ratio of the heat effecting surface can provide higher-quality printing.

The printhead structure can be a combination (linear liquid channel or right-angle liquid channel) of orifices, liquid channels, and electrothermal transducers as those disclosed in the above-mentioned specifications. The present invention also includes structures disclosed in U.S. Pat. Nos. 4,558,333 and 4,459,600 in which the heat effecting surface is arranged in a bent region. The effects of the present invention are also effective for a structure based on Japanese Patent Laid-Open No. 59-123670 which discloses a structure in which a common slit serves as the discharge portions of electrothermal transducers, and a structure based on Japanese Patent Laid-Open No. 59-138461 which discloses a structure in which an opening for absorbing the pressure wave of heat energy corresponds to a discharge portion. In other words, the present invention can reliably, efficiently print regardless of the form of the printhead.

The present invention can also be effectively applied to a full line type printhead having a length corresponding to the maximum width of a printing medium printable by the printing apparatus. Such printhead may take a structure which meets this length by a combination of printheads or a single integrated printhead structure.

The present invention is also effective in the use of the above-described serial type printhead fixed to an apparatus main body, an interchangeable chip type printhead which can be electrically connected to an apparatus main body and receive ink from the apparatus main body when attached to the apparatus main body, or a cartridge type printhead in which an ink tank is integrated with a printhead itself.

It is preferable to add a printhead recovery means or preliminary means to the printing apparatus because the effects of the present invention can then stabilize further. Practical examples of the additional means are a capping means for the printhead, a cleaning means, a pressurizing or suction means, an electrothermal transducer, another heating element, a preliminary heating means as a combination of the electrothermal transducer and heating element, and a preliminary discharge means which performs discharge unrelated to printing.

As for the type or number of mounted printheads, for example, only one printhead may be arranged in correspondence with a single color ink, or a plurality of printheads may be arranged in correspondence with a plurality of types of inks having different printing colors and concentrations. For example, the printing mode of the printing apparatus may use an integrated printhead or a plurality of printheads. The present invention is very effective for an apparatus having at least one of a printing mode in a plurality of different colors or a printing mode in full color by color mixture.

The above embodiments of the present invention assume that ink is a liquid. It is also possible to use ink which solidifies at room temperature or more and softens or liquefies at room temperature. A general apparatus performs temperature control such that the viscosity of ink falls within a stable discharge range by adjusting ink within the range of 30° C. (inclusive) to 70° C. (inclusive). Ink which liquefies when applied with a printing signal in use may be used. In order to positively prevent a temperature rise caused by heat energy by using the temperature rise as energy of the state change from the solid state to the liquid state of ink, or to prevent evaporation of ink, ink which solidifies when left to stand and liquefies when heated can be used. In any case, the present invention is applicable to any ink which liquefies only when heat energy is applied, such as ink which liquefies when applied with heat energy corresponding to a printing signal and is discharged as liquid ink, or ink which already starts to solidify when arriving at a printing medium. As described in Japanese Patent Laid-Open No. 54-56847 or 60-71260, this type of ink can be held as a liquid or solid in a recess or through hole in a porous sheet and opposed to an electrothermal transducer in this state. In the present invention, it is most effective to execute the aforementioned film boiling method for each ink described above.

Furthermore, the ink-jet system according to the present invention may be used as an image output terminal for an information processing device such as a computer. The ink-jet system may take the form of a copying apparatus combined with a reader, or a facsimile apparatus having a transmission/reception function.

The present invention is also achieved by supplying a software program (in the above embodiments, a program corresponding to the flow chart shown in FIG. 17) for realizing the functions of the above-described embodiments to a system or apparatus directly or from a remote place, and reading out and executing the supplied program codes by the computer of the system or apparatus.

The present invention is therefore realized by program codes installed in the computer in order to realize functional processing of the present invention by the computer. That is, the present invention includes a computer program for realizing functional processing of the present invention.

In this case, the present invention can take any program form such as an object code, a program executed by an interpreter, or script data supplied to an OS as long as a program function is attained.

A recording medium for supplying the program includes a floppy® disk, hard disk, optical disk, magnetooptical disk, MO, CD-ROM, CD-R, CD-RW, magnetic tape, nonvolatile memory card, ROM, and DVD (DVD-ROM and DVD-R).

As another program supply method, the program can be supplied by connecting a client computer to an Internet homepage via the browser of the client computer, and downloading the computer program of the present invention or a compressed file containing an automatic installing function from the homepage to a recording medium such as a hard disk. The program can also be realized by grouping program codes which constitute the program of the present invention into a plurality of files, and downloading the files from different homepages. That is, the present invention also includes a WWW server which allows a plurality of users to download the program files for realizing functional processing of the present invention by a computer.

The program of the present invention can be encrypted, stored in a recording medium such as a CD-ROM, and distributed to the user. A user who satisfies predetermined conditions is caused to download decryption key information from a homepage via the Internet. The user executes the encrypted program by using the key information, and installs the program in the computer.

The functions of the above-described embodiments are realized when the computer executes the readout program codes. Also, the functions of the above-described embodiments are realized when an OS or the like running on the computer performs part or all of actual processing on the basis of the instructions of the program codes.

The functions of the above-described embodiments are realized when the program read out from the recording medium is written in the memory of a function expansion board inserted into the computer or the memory of a function expansion unit connected to the computer, and the CPU of the function expansion board or function expansion unit performs part or all of actual processing on the basis of the instructions of the program codes.

As many apparently widely different embodiments of the present invention can be made without departing from the spirit and scope thereof, it is to be understood that the invention is not limited to the specific embodiments thereof except as defined in the appended claims.

What is claimed is:

1. An ink-jet printing method of printing on a printing medium by discharging the ink from a printhead constituted by arraying a plurality of printing nozzle arrays each formed by a plurality of printing nozzles for discharging ink, comprising:

a generation step of generating printing data to be printed by each of at least first and second adjacent printing nozzle arrays out of the plurality of printing nozzle arrays on the basis of tone information of image data to be printed; and a printing step of printing by discharging ink to a pixel of the printing medium from the first and second printing nozzle arrays on the basis of the printing data generated in the generation step, wherein in the generation step, printing data corresponding to each of the first and second printing nozzle arrays is generated in a range in which a sum of the number of dots to be printed by the first printing nozzle array and the number of dots to be printed by the second printing nozzle array does not exceed a predetermined number, and wherein the predetermined number includes a maximum number of printing dots with which influence of an air flow generated along with ink discharge from the first and second printing nozzle arrays is admissible.

2. The method according to claim 1, wherein the first and second printing nozzle arrays are arranged via a common ink chamber.

3. The method according to claim 1, wherein in the generation step, printing data corresponding to each of the first and second printing nozzle arrays is so generated as to relatively decrease the number of printing dots by the second printing nozzle array as the number of printing dots by the first printing nozzle array relatively increases.

4. An ink-jet printing method of printing on a printing medium by discharging ink from a printhead constituted by arraying a plurality of printing nozzle arrays each formed by a plurality of printing nozzles for discharging ink, comprising:

a generation step of generating printing data to be printed by each of at least first and second adjacent printing nozzle arrays out of the plurality of printing nozzle arrays; and a printing step of printing by discharging ink to a predetermined region of the printing medium from the first and second printing nozzle arrays on the basis of the printing data generated in the generation step, wherein in the generation step, printing data to be printed in the predetermined region by each of the first and second printing nozzle arrays is generated in a range in which influence of an air flow generated along with ink discharge from the first and second printing nozzle arrays is admissible.

5. The method according to claim 4, wherein the admissible range includes a range in which a shift amount from an ideal landing position of a dot is less than half of a dot diameter regardless of the influence of an air flow.

6. An ink-jet printing apparatus which prints on a printing medium by discharging ink from a printhead constituted by arraying a plurality of ink discharge printing nozzle arrays, comprising:

generation means for generating printing data to be printed by each of at least first and second adjacent printing nozzle arrays out of the plurality of printing nozzle arrays on the basis of tone information of image data to be printed; and control means for controlling printing by the first and second printing nozzle arrays on the basis of the printing data generated by said generation means, wherein said generation means generates printing data corresponding to each of the first and second printing nozzle arrays in a range in which a sum of the number of dots to be printed by the first printing nozzle array and the number of dots to be printed by the second printing nozzle array does not exceed a predetermined number, and wherein the predetermined number includes a maximum number of printing dots with which influence of an air flow generated along with ink discharge from the first and second printing nozzle arrays is admissible.

7. The apparatus according to claim 6, wherein the first and second printing nozzle arrays are arranged via a common ink chamber.

8. The apparatus according to claim 6, wherein a first ink amount discharged from the first printing nozzle array by one discharge is different from a second ink amount discharged from the second printing nozzle array by one discharge.

9. The apparatus according to claim 8, wherein the first ink amount discharged from the first printing nozzle array by one discharge is larger than the second ink amount discharged from the second printing nozzle array by one discharge.

10. The apparatus according to claim 6, wherein a first printing ratio by the first printing nozzle array is higher than a second printing ratio by the second printing nozzle array.

11. The apparatus according to claim 10, wherein the first and second printing ratios are set different from each other in each printing mode.

12. The apparatus according to claim 6, wherein said generation means independently generates printing data corresponding to the first and second printing nozzle arrays.

13. The apparatus according to claim 6, wherein index processing of converting one printing data generated on the basis of the image data to be printed into printing data for the plurality of printing nozzle arrays is performed.

14. The apparatus according to claim 6, wherein the first and second printing nozzle arrays discharge the same type of ink.

15. The apparatus according to claim 6, wherein the first and second printing nozzle arrays discharge different types of inks.

16. An ink-jet printing apparatus which prints on a printing medium by discharging ink from a printhead constituted by arraying a plurality of printing nozzle arrays each formed by a plurality of printing nozzles for discharging ink, comprising:

generation means for generating printing data to be printed by each of at least first and second adjacent printing nozzle arrays out of the plurality of printing nozzle arrays; and printing control means for printing by discharging ink to a predetermined region of the printing medium from the first and second printing nozzle arrays on the basis of the printing data generated by said generation means, wherein said generation means generates printing data to be printed in the predetermined region by each of the first and second printing nozzle arrays in a range in which influence of an air flow generated along with ink discharge from the first and second printing nozzle arrays is admissible.

17. The apparatus according to claim 16, wherein the admissible range includes a range in which a shift amount from an ideal landing position of a dot is less than half of a dot diameter regardless of the influence of an air flow.

* * * * *

UNITED STATES PATENT AND TRADEMARK OFFICE
CERTIFICATE OF CORRECTION

| | | |
|---|---|---|
| PATENT NO. | : 6,966,621 B2 | Page 1 of 1 |
| APPLICATION NO. | : 10/677370 | |
| DATED | : November 22, 2005 | |
| INVENTOR(S) | : Kiichiro Takahashi et al. | |

It is certified that error appears in the above-identified patent and that said Letters Patent is hereby corrected as shown below:

COLUMN 1:

Line 62, "pit:" should read --pitch:--.

COLUMN 8:

Line 27, "os" should read --of--.

Signed and Sealed this

Fifteenth Day of August, 2006

JON W. DUDAS
*Director of the United States Patent and Trademark Office*